United States Patent
Kundu et al.

(10) Patent No.: US 9,961,514 B2
(45) Date of Patent: May 1, 2018

(54) EFFECTIVE PRESENCE FOR PUSH-TO-TALK-OVER-CELLULAR (POC) NETWORKS

(71) Applicant: Kodiak Networks Inc., Plano, TX (US)

(72) Inventors: Gorachand Kundu, Bangalore (IN); Giridhar K. Boray, Plano, TX (US); Brahmananda R. Vempati, Dallas, TX (US); Krishnakant M. Patel, Richardson, TX (US); Ravi Ayyasamy, Richardson, TX (US); Ramu Kandula, Plano, TX (US); Harisha Mahabaleshwara Negalaguli, Richardson, TX (US)

(73) Assignee: KODIAK NETWORKS, INC., Plano, TX (US)

( * ) Notice: Subject to any disclaimer, the term of this patent is extended or adjusted under 35 U.S.C. 154(b) by 0 days. days.

(21) Appl. No.: 15/004,645

(22) Filed: Jan. 22, 2016

(65) Prior Publication Data

US 2016/0157066 A1    Jun. 2, 2016

Related U.S. Application Data

(63) Continuation of application No. PCT/US2014/047863, filed on Jul. 23, 2014.
(Continued)

(51) Int. Cl.
*H04M 11/00* (2006.01)
*H04W 4/08* (2009.01)
(Continued)

(52) U.S. Cl.
CPC .......... *H04W 4/08* (2013.01); *H04L 65/4061* (2013.01); *H04L 67/24* (2013.01);
(Continued)

(58) Field of Classification Search
CPC ..... H04W 4/08; H04W 76/005; H04W 4/023; H04W 4/10; H04W 4/06; H04L 65/4061; H04L 67/24; H04M 3/561; H04M 3/42374
(Continued)

(56) References Cited

U.S. PATENT DOCUMENTS 3,912,874 A    10/1975  Botterell et al.
4,796,293 A    1/1989   Blinken et al.
(Continued)

FOREIGN PATENT DOCUMENTS

GB    2338150 A       3/1998
JP    200392776 A    10/2004
(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UfCC) Characteristics of the TSIM application", ETSI Technical Specification, Oct. 2003, all pages.
(Continued)

*Primary Examiner* — Marcos Batista

(57) ABSTRACT

A system and method for providing effective presence for Push-to-talk-over-Cellular (PoC) networks, wherein one or more servers performs an effective presence delivery method that reduces presence notifications delivered to mobile units participating in advanced voice services, while ensuring that the presence notifications relevant to the mobile units are available when the advanced voice services are invoked by the mobile units. The presence notifications are used to indicate a change in network presence of the
(Continued)

mobile units. In addition, the presence notifications are used to indicate a change in self-availability status of the mobile units.

25 Claims, 7 Drawing Sheets

Related U.S. Application Data

(60) Provisional application No. 61/857,363, filed on Jul. 23, 2013, provisional application No. 61/944,168, filed on Feb. 25, 2014.

(51) Int. Cl.

| | |
|---|---|
| *H04L 29/08* | (2006.01) |
| *H04W 4/02* | (2018.01) |
| *H04W 4/10* | (2009.01) |
| *H04W 76/00* | (2018.01) |
| *H04M 3/42* | (2006.01) |
| *H04M 3/56* | (2006.01) |
| *H04L 29/06* | (2006.01) |
| *H04W 4/06* | (2009.01) |

(52) U.S. Cl.
CPC ....... *H04M 3/42374* (2013.01); *H04M 3/561* (2013.01); *H04W 4/023* (2013.01); *H04W 4/10* (2013.01); *H04W 76/005* (2013.01); *H04W 76/45* (2018.02); *H04W 4/06* (2013.01)

(58) Field of Classification Search
USPC .......................................... 455/406; 370/338
See application file for complete search history.

(56) References Cited

U.S. PATENT DOCUMENTS

| | | | |
|---|---|---|---|
| 5,353,328 | A | 10/1994 | Jokimies |
| 5,442,809 | A | 8/1995 | Diaz et al. |
| 5,546,449 | A | 8/1996 | Hogan et al. |
| 5,711,011 | A | 1/1998 | Urs et al. |
| 5,752,196 | A | 5/1998 | Ahvenainen et al. |
| 5,987,318 | A | 11/1999 | Alperovich et al. |
| 5,987,331 | A | 11/1999 | Grube et al. |
| 6,011,976 | A | 1/2000 | Michaels et al. |
| 6,021,326 | A | 2/2000 | Nguyen |
| 6,138,011 | A | 10/2000 | Sanders, III et al. |
| 6,141,556 | A | 10/2000 | Dougherty et al. |
| 6,192,119 | B1 | 2/2001 | Wilson |
| 6,304,558 | B1 | 10/2001 | Mysore |
| 6,397,054 | B1 | 5/2002 | Hoirup et al. |
| 6,405,030 | B1 | 6/2002 | Suprunov |
| 6,411,815 | B1 | 6/2002 | Balasuriya |
| 6,473,501 | B1 | 10/2002 | Paulsrud |
| 6,477,366 | B1 | 11/2002 | Valentine et al. |
| 6,477,387 | B1 | 11/2002 | Jackson et al. |
| 6,549,773 | B1 | 4/2003 | Linden et al. |
| 6,577,874 | B1 | 6/2003 | Dailey |
| 6,606,305 | B1 | 8/2003 | Boyle et al. |
| 6,628,937 | B1 | 9/2003 | Salin |
| 6,661,878 | B1 | 12/2003 | Mirashrafi et al. |
| 6,725,053 | B2 | 4/2004 | Rosen et al. |
| 6,751,468 | B1 | 6/2004 | Heubel et al. |
| 6,801,762 | B1 | 10/2004 | Huilgol |
| 6,856,676 | B1 | 2/2005 | Pirot et al. |
| 6,865,398 | B2 | 3/2005 | Mangal et al. |
| 6,892,074 | B2 | 5/2005 | Tarkiainen et al. |
| 6,895,254 | B2 | 5/2005 | Dorenbosch |
| 6,898,436 | B2 | 5/2005 | Crockett et al. |
| 6,993,355 | B1 | 1/2006 | Pershan |
| 6,996,414 | B2 | 2/2006 | Vishwanathan et al. |
| 7,026,926 | B1 | 4/2006 | Walker, III |
| 7,043,266 | B2 | 6/2006 | Chaturvedi et al. |
| 7,082,316 | B2 | 7/2006 | Elden et al. |
| 7,085,364 | B1 | 8/2006 | Ahmed et al. |
| 7,099,291 | B2 | 8/2006 | Harris et al. |
| 7,123,905 | B1 | 10/2006 | Allaway et al. |
| 7,170,863 | B1 | 1/2007 | Denman et al. |
| 7,231,225 | B2 | 6/2007 | Rao et al. |
| 7,236,580 | B1 | 6/2007 | Sarkar et al. |
| 7,330,540 | B2 | 2/2008 | Darby et al. |
| 7,366,535 | B2 | 4/2008 | Glass et al. |
| 7,403,775 | B2 | 7/2008 | Patel et al. |
| 7,460,861 | B2 | 12/2008 | Zabawskj |
| 7,529,557 | B2 | 5/2009 | Farrill |
| 7,689,238 | B2 | 3/2010 | Biswas et al. |
| 7,738,861 | B2 | 6/2010 | Fournier |
| 7,738,892 | B2 | 6/2010 | Ayyasamy et al. |
| 7,738,896 | B2 | 6/2010 | Patel et al. |
| 7,751,348 | B2 | 7/2010 | Shaffer et al. |
| 7,764,950 | B2 | 7/2010 | Patel et al. |
| 7,787,896 | B2 | 8/2010 | Kundu et al. |
| 7,797,010 | B1 | 9/2010 | Manroa et al. |
| 7,813,722 | B2 | 10/2010 | Patel et al. |
| 7,853,279 | B2 | 12/2010 | Patel et al. |
| 8,036,692 | B2 | 10/2011 | Ayyasamy et al. |
| 8,244,252 | B2 | 8/2012 | Descombes |
| 8,369,829 | B2 | 2/2013 | Nagubhai et al. |
| 8,478,261 | B2 | 7/2013 | Vempati et al. |
| 8,498,660 | B2 | 7/2013 | Lawler et al. |
| 8,670,760 | B2 | 3/2014 | Lawler et al. |
| 8,676,189 | B2 | 3/2014 | Lawler et al. |
| 2001/0005372 | A1 | 6/2001 | Cave et al. |
| 2002/0009990 | A1 | 1/2002 | Kleier et al. |
| 2002/0024943 | A1 | 2/2002 | Karaul et al. |
| 2002/0077136 | A1 | 6/2002 | Maggenti et al. |
| 2002/0086659 | A1 | 7/2002 | Lauper |
| 2002/0086676 | A1 | 7/2002 | Hendrey et al. |
| 2002/0102989 | A1 | 8/2002 | Calvert et al. |
| 2002/0187750 | A1 | 12/2002 | Majumdar |
| 2002/0196781 | A1 | 12/2002 | Salovuori |
| 2003/0009463 | A1 | 1/2003 | Gallant |
| 2003/0016632 | A1 | 1/2003 | Refai et al. |
| 2003/0017836 | A1 | 1/2003 | Vishwanathan et al. |
| 2003/0078064 | A1 | 4/2003 | Chan |
| 2003/0119540 | A1 | 6/2003 | Mathis |
| 2003/0148779 | A1 | 8/2003 | Aravamudan et al. |
| 2003/0149774 | A1 | 8/2003 | McConnell et al. |
| 2003/0153343 | A1 | 8/2003 | Crockett et al. |
| 2003/0190888 | A1 | 10/2003 | Mangal et al. |
| 2004/0032843 | A1 | 2/2004 | Schaefer et al. |
| 2004/0057449 | A1 | 3/2004 | Black |
| 2004/0067751 | A1 | 4/2004 | Vandermeijden et al. |
| 2004/0095954 | A1 | 5/2004 | Varney et al. |
| 2004/0121760 | A1 | 6/2004 | Wetman et al. |
| 2004/0127233 | A1 | 7/2004 | Harris et al. |
| 2004/0152441 | A1 | 8/2004 | Wong |
| 2004/0176100 | A1 | 9/2004 | Florkey et al. |
| 2004/0179531 | A1 | 9/2004 | Bi et al. |
| 2004/0196826 | A1 | 10/2004 | Bao et al. |
| 2004/0203793 | A1 | 10/2004 | Dorenbosch |
| 2004/0219941 | A1 | 11/2004 | Haaramo et al. |
| 2004/0224710 | A1 | 11/2004 | Koskelainen et al. |
| 2004/0228292 | A1 | 11/2004 | Edwards |
| 2004/0259580 | A1 | 12/2004 | Florkey et al. |
| 2005/0047362 | A1 | 3/2005 | Harris et al. |
| 2005/0101308 | A1 | 5/2005 | Lee |
| 2005/0111430 | A1 | 5/2005 | Spear et al. |
| 2005/0119012 | A1 | 6/2005 | Merheb et al. |
| 2005/0143135 | A1 | 6/2005 | Brems et al. |
| 2005/0164737 | A1 | 7/2005 | Brown |
| 2005/0189337 | A1 | 9/2005 | Baune |
| 2005/0192041 | A1 | 9/2005 | Oxley et al. |
| 2005/0202807 | A1 | 9/2005 | Ayyasamy et al. |
| 2005/0221819 | A1 | 10/2005 | Patel et al. |
| 2005/0232241 | A1 | 10/2005 | Wu et al. |
| 2005/0239485 | A1 | 10/2005 | Kundu et al. |
| 2005/0254464 | A1 | 11/2005 | Patel et al. |
| 2005/0261016 | A1 | 11/2005 | Patel et al. |
| 2006/0003740 | A1 | 1/2006 | Munje |
| 2006/0003751 | A1 | 1/2006 | Vo |
| 2006/0019654 | A1 | 1/2006 | Farrill |
| 2006/0029189 | A1 | 2/2006 | Patel et al. |

(56) References Cited

U.S. PATENT DOCUMENTS

| | | |
|---|---|---|
| 2006/0030347 A1 | 2/2006 | Biswas |
| 2006/0031368 A1* | 2/2006 | deCone .................. G06F 9/546 709/207 |
| 2006/0056361 A1 | 3/2006 | Jiang et al. |
| 2006/0067499 A1 | 3/2006 | Oliveira et al. |
| 2006/0078064 A1 | 4/2006 | Schmidt et al. |
| 2006/0079244 A1 | 4/2006 | Posner et al. |
| 2006/0094455 A1 | 5/2006 | Hannu et al. |
| 2006/0116150 A1 | 6/2006 | Bhutiani |
| 2006/0128411 A1 | 6/2006 | Turcanu |
| 2006/0178138 A1 | 8/2006 | Ostroff et al. |
| 2006/0189337 A1 | 8/2006 | Farrill et al. |
| 2006/0198334 A1 | 9/2006 | Civanlar et al. |
| 2006/0229090 A1 | 10/2006 | Ladue |
| 2006/0234687 A1 | 10/2006 | Patel et al. |
| 2006/0286993 A1 | 12/2006 | Xie et al. |
| 2007/0037562 A1 | 2/2007 | Smith-Kerker et al. |
| 2007/0037597 A1 | 2/2007 | Biswas et al. |
| 2007/0037598 A1 | 2/2007 | Ayyasamy et al. |
| 2007/0049314 A1 | 3/2007 | Balachandran et al. |
| 2007/0070976 A1 | 3/2007 | Mussman et al. |
| 2007/0099609 A1 | 5/2007 | Cai |
| 2007/0133757 A1 | 6/2007 | Girouard et al. |
| 2007/0154005 A1 | 7/2007 | Daigle |
| 2007/0189487 A1 | 8/2007 | Sharland et al. |
| 2007/0190492 A1 | 8/2007 | Schmitt |
| 2007/0190984 A1 | 8/2007 | Ayyasamy et al. |
| 2007/0197234 A1 | 8/2007 | Gill et al. |
| 2007/0204039 A1 | 8/2007 | Inamdar |
| 2007/0217591 A1 | 9/2007 | Yasuma |
| 2007/0218885 A1 | 9/2007 | Pfleging et al. |
| 2007/0253347 A1 | 11/2007 | Patel et al. |
| 2008/0064364 A1 | 3/2008 | Patel et al. |
| 2008/0126230 A1 | 5/2008 | Bellora et al. |
| 2008/0147671 A1 | 6/2008 | Simon et al. |
| 2008/0155689 A1 | 6/2008 | Denninghoff et al. |
| 2008/0161062 A1 | 7/2008 | Harris et al. |
| 2008/0299953 A1 | 12/2008 | Rao |
| 2009/0092116 A1 | 4/2009 | Jiang et al. |
| 2009/0119678 A1 | 5/2009 | Shih et al. |
| 2009/0149167 A1 | 6/2009 | Patel et al. |
| 2009/0209235 A1 | 8/2009 | Lawler et al. |
| 2009/0325540 A1 | 12/2009 | Yach et al. |
| 2010/0035593 A1 | 2/2010 | Fanco et al. |
| 2010/0142414 A1 | 6/2010 | Patel et al. |
| 2010/0190492 A1 | 7/2010 | Jiang |
| 2010/0195554 A1 | 8/2010 | Song et al. |
| 2010/0234018 A1 | 9/2010 | Lawler et al. |
| 2011/0151917 A1 | 6/2011 | Mao et al. |
| 2011/0183659 A1 | 7/2011 | Ayyasamy et al. |
| 2011/0250923 A1 | 10/2011 | Miller et al. |
| 2012/0170352 A1 | 7/2012 | Le Neel et al. |
| 2012/0278490 A1 | 11/2012 | Sennett et al. |
| 2013/0155875 A1 | 6/2013 | Ayyasamy et al. |
| 2013/0196706 A1 | 8/2013 | Patel et al. |
| 2013/0337859 A1 | 12/2013 | Patel et al. |
| 2014/0148210 A1 | 5/2014 | Kundu et al. |

FOREIGN PATENT DOCUMENTS

| | | |
|---|---|---|
| WO | 00069189 | 11/2000 |
| WO | 0079825 A1 | 12/2000 |
| WO | 0167674 A2 | 9/2001 |
| WO | 02101981 A1 | 12/2002 |
| WO | 03101007 A1 | 12/2003 |
| WO | 2005009006 A2 | 1/2005 |
| WO | 2005112494 A1 | 11/2005 |
| WO | 2005115032 A1 | 12/2005 |
| WO | 2005117474 A1 | 12/2005 |
| WO | 2006105287 A2 | 10/2006 |
| WO | 2010048217 A1 | 4/2010 |
| WO | 2010117815 A1 | 10/2010 |

OTHER PUBLICATIONS

Nokia: "What is TETRA? Why Nokia TETRA?", The Nokia TETRA Primer, 2002, pp. 1-29.

Skype: "Skype", Web Archive—Skype, May 22, 2004, pp. 1-2, May 22, 2004, pp. 1-2.

Trachwell: "TrackWell Software and Tetra Iceland deliver value added services to Tetra users", TRACKWELL.COM, Oct. 2002, pp. 1-1.

* cited by examiner

EFFECTIVE PRESENCE FOR PUSH-TO-TALK-OVER-CELLULAR (POC) NETWORKS

This application is a continuation of PCT/US2014/047863, filed on Jul. 23, 2014 which claims the benefit under 35 U.S.C. Section 119(e) U.S. Provisional Application Ser. No. 61/857,363, filed Jul. 23, 2013, entitled "EFFECTIVE PRESENCE FOR PUSH-TO-TALK-OVER-CELLULAR (PoC) NETWORKS," and U.S. Provisional Application Ser. No. 61/944,168, filed Feb. 25, 2014, entitled "EFFECTIVE PRESENCE FOR PUSH-TO-TALK-OVER-CELLULAR (PoC) NETWORKS," which applications are incorporated by reference herein.

This application is related to the following commonly-assigned patent applications:

U.S. Utility application Ser. No. 10/515,556, filed Nov. 23, 2004, by Gorachand Kundu, Ravi Ayyasamy and Krishnakant Patel, entitled "DISPATCH SERVICE ARCHITECTURE FRAMEWORK," now U.S. Pat. No. 7,787,896, issued Aug. 31, 2010, which application claims the benefit under 35 U.S.C. Section 365 of P.C.T. International Application Serial Number PCT/US03/16386 (154.4-WO-U1), which application claims the benefit under 35 U.S.C. Section 119(e) of U.S. Provisional Application Ser. Nos. 60/382,981 (154.3-US-P1), 60/383,179 (154.4-US-P1) and 60/407,168 (154.5-US-P1);

U.S. Utility application Ser. No. 10/564,903, filed Jan. 17, 2006, by F. Craig Farrill, Bruce D. Lawler and Krishnakant M. Patel, entitled "PREMIUM VOICE SERVICES FOR WIRELESS COMMUNICATIONS SYSTEMS," which application claims the benefit under 35 U.S.C. Section 365 of P.C.T. International Application Serial Number PCT/US04/23038 (154.7-WO-U1), which application claims the benefit under 35 U.S.C. Section 119(e) of U.S. Provisional Application Ser. Nos. 60/488,638 (154.7-US-P1), 60/492,650 (154.8-US-P1) and 60/576,094 (154.14-US-P1) and which application is a continuation-in-part and claims the benefit under 35 U.S.C. Sections 119, 120 and/or 365 of P.C.T. International Application Serial Number PCT/US03/16386 (154.4-WO-U1);

U.S. Utility application Ser. No. 11/126,587, filed May 11, 2005, by Ravi Ayyasamy and Krishnakant M. Patel, entitled "ARCHITECTURE, CLIENT SPECIFICATION AND APPLICATION PROGRAMMING INTERFACE (API) FOR SUPPORTING ADVANCED VOICE SERVICES (AVS) INCLUDING PUSH TO TALK ON WIRELESS HANDSETS AND NETWORKS," now U.S. Pat. No. 7,738,892, issued Jun. 15, 2010, which application claims the benefit under 35 U.S.C. Section 119(e) of U.S. Provisional Application Ser. Nos. 60/569,953 (154.9-US-P1) and 60/579,309 (154.15-US-P1), and which application is a continuation-in-part and claims the benefit under 35 U.S.C. Sections 119, 120 and/or 365 of U.S. Utility application Ser. No. 10/515,556 (154.4-US-WO) and P.C.T. International Application Serial Number PCT/US04/23038 (154.7-WO-U1);

U.S. Utility application Ser. No. 11/129,268, filed May 13, 2005, by Krishnakant M. Patel, Gorachand Kundu, Ravi Ayyasamy and Basem Ardah, entitled "ROAMING GATEWAY FOR SUPPORT OF ADVANCED VOICE SERVICES WHILE ROAMING IN WIRELESS COMMUNICATIONS SYSTEMS," now U.S. Pat. No. 7,403,775, issued Jul. 22, 2008, which application claims the benefit under 35 U.S.C. Section 119(e) of U.S. Provisional Application Ser. No. 60/571,075 (154.10-US-P1), and which application is a continuation-in-part and claims the benefit under 35 U.S.C. Sections 119, 120 and/or 365 of U.S. Utility application Ser. No. 10/515,556 (154.4-US-WO) and P.C.T. International Application Serial Number PCT/US04/23038 (154.7-WO-U1);

U.S. Utility application Ser. No. 11/134,883, filed May 23, 2005, by Krishnakant Patel, Vyankatesh V. Shanbhag, Ravi Ayyasamy, Stephen R. Horton and Shan-Jen Chiou, entitled "ADVANCED VOICE SERVICES ARCHITECTURE FRAMEWORK," now U.S. Pat. No. 7,764,950, issued Jul. 27, 2010, which application claims the benefit under 35 U.S.C. Section 119(e) of U.S. Provisional Application Ser. Nos. 60/573,059 (154.11-US-P1) and 60/576,092 (154.12-US-P1), and which application is a continuation-in-part and claims the benefit under 35 U.S.C. Sections 119, 120 and/or 365 of U.S. Utility application Ser. No. 10/515,556 (154.4-US-WO), P.C.T. International Application Serial Number PCT/US04/23038 (154.7-WO-U1), U.S. Utility application Ser. No. 11/126,587 (154.9-US-U1), and U.S. Utility application Ser. No. 11/129,268 (154.10-US-U1);

U.S. Utility application Ser. No. 11/136,233, filed May 24, 2005, by Krishnakant M. Patel, Vyankatesh Vasant Shanbhag, and Anand Narayanan, entitled "SUBSCRIBER IDENTITY MODULE (SIM) ENABLING ADVANCED VOICE SERVICES (AVS) INCLUDING PUSH-TO-TALK, PUSH-TO-CONFERENCE AND PUSH-TO-MESSAGE ON WIRELESS HANDSETS AND NETWORKS," now U.S. Pat. No. 7,738,896, issued Jun. 15, 2010, which application claims the benefit under 35 U.S.C. Section 119(e) of U.S. Provisional Application Ser. No. 60/573,780 (154.13-US-P1), and which application is a continuation-in-part and claims the benefit under 35 U.S.C. Sections 119, 120 and/or 365 of U.S. Utility application Ser. No. 10/515,556 (154.4-US-WO), P.C.T. International Application Serial Number PCT/US04/23038 (154.7-WO-U1), U.S. Utility application Ser. No. 11/126,587 (154.9-US-U1), and U.S. Utility application Ser. No. 11/134,883 (154.11-US-U1);

U.S. Utility application Ser. No. 11/158,527, filed Jun. 22, 2005, by F. Craig Farrill, entitled "PRESS-TO-CONNECT FOR WIRELESS COMMUNICATIONS SYSTEMS," now U.S. Pat. No. 7,529,557, issued May 5, 2009, which application claims the benefit under 35 U.S.C. Section 119(e) of U.S. Provisional Application Ser. No. 60/581,954 (154.16-US-P1), and which application is a continuation-in-part and claims the benefit under 35 U.S.C. Sections 119, 120 and/or 365 of U.S. Utility application Ser. No. 10/515,556 (154.4-US-WO) and P.C.T. International Application Serial Number PCT/US04/23038 (154.7-WO-U1);

U.S. Utility application Ser. No. 11/183,516, filed Jul. 18, 2005, by Deepankar Biswaas, entitled "VIRTUAL PUSH TO TALK (PTT) AND PUSH TO SHARE (PTS) FOR WIRELESS COMMUNICATIONS SYSTEMS," which application claims the benefit under 35 U.S.C. Section 119(e) of U.S. Provisional Application Ser. No. 60/588,464 (154.17-US-P1);

U.S. Utility application Ser. No. 11/356,775, filed Feb. 17, 2006, by Krishnakant M. Patel, Bruce D. Lawler, Giridhar K. Boray, and Brahmananda R. Vempati, entitled "ENHANCED FEATURES IN AN ADVANCED VOICE SERVICES (AVS) FRAMEWORK FOR WIRELESS COMMUNICATIONS SYSTEMS," now U.S. Pat. No. 7,813,722, issued Oct. 12, 2010, which application claims the benefit under 35 U.S.C. Section 119(e) of U.S. Provisional Application Ser. No. 60/654,271 (154.18-US-P1);

P.C.T. International Application Serial Number PCT/US2006/011628, filed Mar. 30, 2006, by Krishnakant M. Patel, Gorachand Kundu, Sameer Dharangaonkar, Giridhar K. Boray, and Deepankar Biswas, entitled "TECHNIQUE FOR IMPLEMENTING ADVANCED VOICE SERVICES USING AN UNSTRUCTURED SUPPLEMENTARY SERVICE DATA (USSD) INTERFACE," which application claims the benefit under 35 U.S.C. Section 119(e) of U.S. Provisional Application Ser. No. 60/666,424 (154.19-US-P1);

U.S. Utility application Ser. No. 11/462,332, filed Aug. 3, 2006, by Deepankar Biswas, Krishnakant M. Patel, Giridhar K. Boray, and Gorachand Kundu, entitled "ARCHITECTURE AND IMPLEMENTATION OF CLOSED USER GROUP AND LIMITING MOBILITY IN WIRELESS NETWORKS," now U.S. Pat. No. 7,689,238, issued Mar. 30, 2010, which application claims the benefit under 35 U.S.C. Section 119(e) of U.S. Provisional Application Ser. No. 60/705,115 (154.20-US-P1);

U.S. Utility application Ser. No. 11/463,186, filed Aug. 8, 2006, by Ravi Ayyasamy and Krishnakant M. Patel, entitled "ADVANCED VOICE SERVICES CLIENT FOR BREW PLATFORM," now U.S. Pat. No. 8,036,692, issued Oct. 11, 2011, which application claims the benefit under 35 U.S.C. Section 119(e) of U.S. Provisional Application Ser. No. 60/706,265 (154.21-US-P1);

U.S. Utility application Ser. No. 11/567,098, filed Dec. 5, 2006, by Ravi Ayyasamy, Bruce D. Lawler, Krishnakant M. Patel, Vyankatesh V. Shanbhag, Brahmananda R. Vempati, and Ravi Shankar Kumar, entitled "INSTANT MESSAGING INTERWORKING IN AN ADVANCED VOICE SERVICES (AVS) FRAMEWORK FOR WIRELESS COMMUNICATIONS SYSTEMS," which application claims the benefit under 35 U.S.C. Section 119(e) of U.S. Provisional Application Ser. No. 60/742,250 (154.23-US-P1);

U.S. Utility application Ser. No. 11/740,805, filed Apr. 26, 2007, by Krishnakant M. Patel, Giridhar K. Boray, Ravi Ayyasamy, and Gorachand Kundu, entitled "ADVANCED FEATURES ON A REAL-TIME EXCHANGE SYSTEM," now U.S. Pat. No. 7,853,279, issued Dec. 14, 2010, which application claims the benefit under 35 U.S.C. Section 119(e) of U.S. Provisional Application Ser. No. 60/795,090 (154.26-US-P1);

U.S. Utility application Ser. No. 11/891,127, filed Aug. 9, 2007, by Krishnakant M. Patel, Deepankar Biswas, Sameer P. Dharangaonkar and Terakanambi Nanjanayaka Raja, entitled "EMERGENCY GROUP CALLING ACROSS MULTIPLE WIRELESS NETWORKS," which application claims the benefit under 35 U.S.C. Section 119(e) of U.S. Provisional Application Ser. No. 60/836,521 (154.27-US-P1);

U.S. Utility application Ser. No. 12/259,102, filed on Oct. 27, 2008, by Krishnakant M. Patel, Gorachand Kundu, and Ravi Ayyasamy, entitled "CONNECTED PORTFOLIO SERVICES FOR A WIRELESS COMMUNICATIONS NETWORK," which application claims the benefit under 35 U.S.C. Section 119(e) of U.S. Provisional Application Ser. Nos. 60/982,650 (154.32-US-P1) and 61/023,042 (154.32-US-P2);

U.S. Utility application Ser. No. 12/359,861, filed on Jan. 26, 2009, by Bruce D. Lawler, Krishnakant M. Patel, Ravi Ayyasamy, Harisha Mahabaleshwara Negalaguli, Binu Kaiparambil, Shiva Cheedella, Brahmananda R. Vempati, Ravi Shankar Kumar, and Avrind Shanbhag, entitled "CONVERGED MOBILE-WEB COMMUNICATIONS SOLUTION," now U.S. Pat. No. 8,676,189, issued Mar. 18, 2014, which application claims the benefit under 35 U.S.C. Section 119(e) of U.S. Provisional Application Ser. No. 61/023,332 (154.33-US-P1);

U.S. Utility application Ser. No. 12/582,601, filed Oct. 20, 2009, by Krishnakant M. Patel, Ravi Ayyasamy, Gorachand Kundu, Basem A. Ardah, Anand Narayanan, Brahmananda R. Vempati, and Pratap Chandana, entitled "HYBRID PUSH-TO-TALK FOR MOBILE PHONE NETWORKS," which application claims the benefit under 35 U.S.C. Section 119(e) of U.S. Provisional Application Ser. No. 61/106,689 (154.36-US-P1);

U.S. Utility application Ser. No. 12/781,566, filed on May 17, 2010, by Bruce D. Lawler, Krishnakant M. Patel, Ravi Ayyasamy, Harisha Mahabaleshwara Negalaguli, Binu Kaiparambil, Shiva K. K. Cheedella, Brahmananda R. Vempati, and Ravi Shankar Kumar, entitled "CONVERGED MOBILE-WEB COMMUNICATIONS SOLUTION," now U.S. Pat. No. 8,670,760, issued Mar. 11, 2014, which application is a continuation-in-part and claims the benefit under 35 U.S.C. Sections 119, 120 and/or 365 of U.S. Utility application Ser. No. 12/582,601 (154.36-US-U1);

U.S. Utility application Ser. No. 12/750,175, filed on Mar. 30, 2010, by Bruce D. Lawler, Krishnakant M. Patel, Ravi Ayyasamy, Harisha Mahabaleshwara Negalaguli, Basem A. Ardah, Gorachund Kundu, Ramu Kandula, Brahmananda R. Vempati, Ravi Shankar Kumar, Chetal M. Patel, and Shiva K. K. Cheedella, entitled "ENHANCED GROUP CALLING FEATURES FOR CONNECTED PORTFOLIO SERVICES IN A WIRELESS COMMUNICATIONS NETWORK," now U.S. Pat. No. 8,498,660, issued Jul. 30, 2013, which application claims the benefit under 35 U.S.C. Section 119(e) of U.S. Provisional Application Ser. Nos. 61/164,754 (154.39-US-P1) and 61/172,129 (154.39-US-P2);

U.S. Utility application Ser. No. 12/961,419, filed Dec. 6, 2010, by Ravi Ayyasamy, Bruce D. Lawler, Brahmananda R. Vempati, Gorachand Kundu and Krishnakant M. Patel, entitled "COMMUNITY GROUP CLIENT AND COMMUNITY AUTO DISCOVERY SOLUTIONS IN A WIRELESS COMMUNICATIONS NETWORK," which application claims the benefit under 35 U.S.C. Section 119(e) of U.S. Provisional Application Ser. No. 61/266,896 (154.40-US-P1);

U.S. Utility application Ser. No. 13/039,635, filed on Mar. 3, 2011, by Narasimha Raju Nagubhai, Ravi Shankar Kumar, Krishnakant M. Patel, and Ravi Ayyasamy, entitled "PREPAID BILLING SOLUTIONS FOR PUSH-TO-TALK IN A WIRELESS COMMUNICATIONS NETWORK," now U.S. Pat. No. 8,369,829, issued Feb. 5, 2013, which application claims the benefit under 35 U.S.C. Section 119(e) of U.S. Provisional Application Ser. No. 61/310,245 (154.41-US-P1);

U.S. Utility application Ser. No. 13/093,542, filed Apr. 25, 2011, by Brahmananda R. Vempati, Krishnakant M. Patel, Pratap Chandana, Anand Narayanan, Ravi Ayyasamy, Bruce D. Lawler, Basem A. Ardah, Ramu Kandula, Gorachand Kundu, Ravi Shankar Kumar, and Bibhudatta Biswal, and entitled "PREDICTIVE WAKEUP FOR PUSH-TO-TALK-OVER-CELLULAR (PoC) CALL SETUP OPTIMIZATIONS," now U.S. Pat. No. 8,478,261, issued Jul. 2, 2013, which application claims the benefit under 35 U.S.C. Section 119(e) of U.S. Provisional Application Ser. No. 61/347,217, filed May 21, 2010, by Brahmananda R. Vempati, Krishnakant M. Patel, Pratap Chandana, Anand Narayanan, and Ravi Ayyasamy, entitled "PREDICTIVE WAKEUP FOR PUSH-TO-TALK-OVER-CELLULAR (PoC) CALL SETUP OPTIMIZATIONS,";

U.S. Utility application Ser. No. 13/710,683, filed Dec. 11, 2012, by Ravi Ayyasamy, Gorachand Kundu, Krishnakant M. Patel, Brahmananda R. Vempati, Harisha M. Negalaguli, Shiva K. K. Cheedella, Basem A. Ardah, Ravi Shankar Kumar, Ramu Kandula, Arun Velayudhan, Shibu Narendranathan, Bharatram Setti, Anand Narayanan, and Pratap Chandana, entitled "PUSH-TO-TALK-OVER-CELLULAR (PoC)," which application claims the benefit under 35 U.S.C. Section 119(e) of U.S. Provisional Application Ser. No. 61/570,694, filed Dec. 14, 2011, by Ravi Ayyasamy, Gorachand Kundu, Krishnakant M. Patel, Brahmananda R. Vempati, Harisha Mahabaleshwara Negalaguli, Shiva Koteshwara Kiran Cheedella, Basem A. Ardah, Ravi Shankar Kumar, Ramu Kandula, Arun Velayudhan, Shibu Narendranathan, Bharatram Setti, Anand Narayanan, and Pratap Chandana, entitled "PUSH-TO-TALK-OVER-CELLULAR (PoC),";

U.S. Utility application Ser. No. 13/917,561, filed Jun. 13, 2013, by Krishnakant M. Patel, Brahmananda R. Vempati, Anand Narayanan, Gregory J. Morton, and Ravi Ayyasamy, entitled "RUGGEDIZED CASE OR SLEEVE FOR PROVIDING PUSH-TO-TALK (PTT) FUNCTIONS," which application claims the benefit under 35 U.S.C. Section 119(e) of U.S. Provisional Application Ser. No. 61/659,292, filed Jun. 13, 2012, by Krishnakant M. Patel, Brahmananda R. Vempati, Anand Narayanan, and Gregory J. Morton, entitled "PUSH-TO-TALK CASE OR SLEEVE FOR CONVERTING GENERIC DEVICES TO FUNCTION LIKE PURPOSE-BUILT PUSH-TO-TALK DEVICES,"; U.S. Provisional Application Ser. No. 61/682,524, filed Aug. 13, 2012, by Krishnakant M. Patel, Brahmananda R. Vempati, Anand Narayanan, and Gregory J. Morton, entitled "RUGGEDIZED PUSH-TO-TALK (PTT) CASE,"; and U.S. Provisional Application Ser. No. 61/705,748, filed Sep. 26, 2012, by Krishnakant M. Patel, Brahmananda R. Vempati, Anand Narayanan, Gregory J. Morton, and Ravi Ayyasamy, entitled "PUSH-TO-TALK CASE OR SLEEVE FOR CONVERTING GENERIC DEVICES TO FUNCTION LIKE PURPOSE-BUILT PUSH-TO-TALK DEVICES,"; and U.S. Utility application Ser. No. 13/757,520, filed Feb. 1, 2013, by Krishnakant M. Patel, Harisha Mahabaleshwara Negalaguli, Brahmananda R. Vempati, Shiva Koteshwara Kiran Cheedella, Arun Velayudhan, Raajeev Kuppa, Gorachand Kundu, Ravi Ganesh Ramamoorthy, Ramu Kandula, Ravi Ayyasamy, and Ravi Shankar Kumar, entitled "WiFi INTERWORKING SOLUTIONS FOR PUSH-TO-TALK-OVER-CELLULAR (PoC)," which application claims the benefit under 35 U.S.C. Section 119(e) of U.S. Provisional Application Ser. No. 61/593,485, filed Feb. 1, 2012, by Krishnakant M. Patel, Harisha Mahabaleshwara Negalaguli, Brahmananda R. Vempati, Shiva Koteshwara Kiran Cheedella, Arun Velayudhan, Raajeev Kuppa, and Gorachand Kundu, entitled "WiFi INTERWORKING SOLUTIONS FOR PUSH-TO-TALK OVER CELLULAR (PoC) IN THE OPEN MOBILE ALLIANCE (OMA) STANDARD,";

U.S. Utility application Ser. No. 14/093,240, filed Nov. 29, 2013, by Gorachand Kundu, Krishnakant M. Patel, Harisha Mahabaleshwara Negalaguli, Ramu Kandula, and Ravi Ayyasamy, entitled "METHOD AND FRAMEWORK TO DETECT SERVICE USERS IN INSUFFICIENT WIRELESS RADIO COVERAGE NETWORK AND IMPROVE SERVICE DELIVERY EXPERIENCE BY GUARANTEED PRESENCE," which application claims the benefit under 35 U.S.C. Section 119(e) of U.S. Provisional Application Ser. No. 61/730,856, filed Nov. 28, 2012, by Gorachand Kundu, Krishnakant M. Patel, Harisha Mahabaleshwara Negalaguli, Ramu Kandula, and Ravi Ayyasamy, entitled "METHOD AND FRAMEWORK TO DETECT SERVICE USERS IN INSUFFICIENT WIRELESS RADIO COVERAGE NETWORK AND IMPROVE SERVICE DELIVERY EXPERIENCE BY GUARANTEED PRESENCE,";

P.C.T. International Application Serial Number PCT/US2014/036414, filed May 1, 2014, by Krishnakant M. Patel, Harisha Mahabaleshwara Negalaguli, Arun Velayudhan, Ramu Kandula, Syed Nazir Khadar, Shiva Koteshwara Kiran Cheedella, and Subramanyam Narasimha Prashanth, entitled "VOICE-OVER-IP (VOIP) DENIAL OF SERVICE (DOS) PROTECTION MECHANISMS FROM ATTACK," which application claims the benefit under 35 U.S.C. Section 119(e) of U.S. Provisional Application Ser. No. 61/818,109, filed May 1, 2013, by Harisha M. Negalaguli, Krishnakant M. Patel, Arun Velayudhan, Ramu Kandula, Syed N. Khadar, and Subramanyam N. Prashanth, entitled "VOICE-OVER-IP (VOIP) DENIAL OF SERVICE (DOS) PROTECTION MECHANISMS,"; and U.S. Provisional Application Ser. No. 61/821,975, filed May 10, 2013, by Krishnakant M. Patel, Harisha M. Negalaguli, Arun Velayudhan, and Ramu Kandula, entitled "PROTECTION MECHANISMS FROM ATTACKS,";

U.S. Utility application Ser. No. 14/286,427, filed May 23, 2014, by Krishnakant M. Patel, Ravi Ayyasamy and Brahmananda R. Vempati, entitled "METHOD TO ACHIEVE A FULLY ACKNOWLEDGED MODE COMMUNICATION IN PUSH-TO-TALK OVER CELLULAR (PoC)," which application claims the benefit under 35 U.S.C. Section 119(e) of U.S. Provisional Application Ser. No. 61/826,895, filed May 23, 2013, by Krishnakant M. Patel, Ravi Ayyasamy and Brahmananda R. Vempati, entitled "METHOD TO ACHIEVE A FULLY ACKNOWLEDGED MODE COMMUNICATION IN PUSH-TO-TALK OVER CELLULAR (PoC),";

all of which applications are incorporated by reference herein.

FIELD OF THE INVENTION

This invention relates in general to advanced voice services in wireless communications networks, and more specifically, to a system and method for providing effective presence for Push-to-talk-over-Cellular (PoC) networks.

BACKGROUND

Advanced voice services (AVS), also known as Advanced Group Services (AGS), such as two-way half-duplex voice calls within a group, also known as Push-to-talk-over-Cellular (PoC), Push-to-Talk (PTT), or Press-to-Talk (P2T), as well as other AVS functions, such as Push-to-Conference (P2C) or Instant Conferencing, Push-to-Message (P2M), etc., are described in the co-pending and commonly-assigned patent applications cross-referenced above and incorporated by reference herein. These AVS functions have enormous revenue earnings potential for wireless communications systems, such as cellular networks, wireless data networks and IP networks.

One approach to PoC is based on packet or voice-over-IP (VoIP) technologies. This approach capitalizes on the "bursty" nature of PoC conversations and makes network resources available only during talk bursts and hence is highly efficient from the point of view of network and spectral resources. This approach promises compliance with newer and emerging packet-based standards, such as GPRS (General Packet Radio Service), UMTS (Universal Mobile Telecommunications System), 3G, 4G, LTE, etc.

Nonetheless, there is a need in the art for improvements to the methods and systems for delivering the advanced voice services, such as PoC, that comply with both existing and emerging wireless packet-based standards and yet provide superior user experiences with optimal use of network resources. Many existing implementations of PoC suffer from an inferior user experience and result in inefficient usage of network resources. The present invention satisfies the need for a superior user experience, minimizes unnecessary messaging and also defines procedures for practical implementation of PoC in commercial, standards-based, cellular networks.

SUMMARY

To overcome the limitations in the prior art described above, and to overcome other limitations that will become apparent upon reading and understanding the present specification, the present invention discloses a system and method for providing advanced voice services in one or more wireless communications networks, and more specifically, to a system and method for providing effective presence for Push-to-talk-over-Cellular (PoC) networks. Effective Presence is an approach for determining accurate network and user presence status of a PoC user with optimal use of network resources and minimizing unnecessary messaging traffic.

The system and method includes one or more servers that interfaces to the wireless communications network to perform advanced voice services for one or more mobile units therein, wherein the advanced voice services include an instant two-way half-duplex voice call within a group of the mobile units comprising a PoC call session. Both the servers and the mobile units that use the advanced group services communicate with each other using control messages within the wireless communications network, and at least one of the servers switches voice messages for the advanced group services between the mobile units across the wireless communications network. At least one of the servers manages the PoC call session by acting as an arbitrator for the PoC call session and controls the sending of the control messages and the voice messages to and from the mobile unit. In addition, at least one of the servers performs an effective presence delivery method that optimizes presence notifications delivered to the mobile units participating in the advanced voice services, while ensuring that the presence notifications relevant to the mobile units are available when the advanced voice services are invoked by the mobile units.

The presence notifications are used to indicate a change in network presence of the mobile units. In addition, the presence notifications are used to indicate a change in self-availability status of the mobile units.

The effective presence delivery method may be a predictive method that determines whether the presence notifications are relevant to a mobile unit. In addition, the effective presence delivery method may be a reactive method that corrects presence status mismatches by delivering the presence notifications to a mobile unit.

The predictive method may use the following: (1) a Relevant Contact List that identifies the presence notifications for contacts that are relevant to the mobile unit, wherein the Relevant Contact List is formed by combining a plurality of pre-configured or heuristically determined data sources according to weightings assigned to each of the data sources; (2) a Frequently Used Contact List that identifies the presence notifications for contacts that have been frequently used by the mobile unit, wherein the Frequently Used Contact List is computed heuristically from call history data of the mobile unit, and the call history is partitioned across a period of time; (3) a Recently Used Contact List that identifies the presence notifications for contacts that have been recently used by the mobile unit; (4) a Favorite Contact List that identifies the presence notifications for contacts that have been identified as favorites by a user of the mobile unit; and (5) a PoC Contact List that identifies the presence notifications for contacts stored on the mobile unit.

In addition, the predictive method may use presence traffic discrimination to identify types of the presence notifications that are relevant to the mobile unit. The predictive method also may use a periodic synchronization to send the presence notifications to the mobile unit.

The reactive method may use the following: (1) the reactive method may track activity of the mobile unit and provides the presence notifications for contacts to the mobile unit when the advanced call services are invoked for the contacts; (2) the reactive method may request the presence notifications; and (3) the reactive method may obtain the presence notifications in response to contact list scrolling or searching on the mobile unit.

BRIEF DESCRIPTION OF THE DRAWINGS

Referring now to the drawings in which like reference numbers represent corresponding parts throughout.

DETAILED DESCRIPTION OF ILLUSTRATIVE EMBODIMENTS

Figure 1:
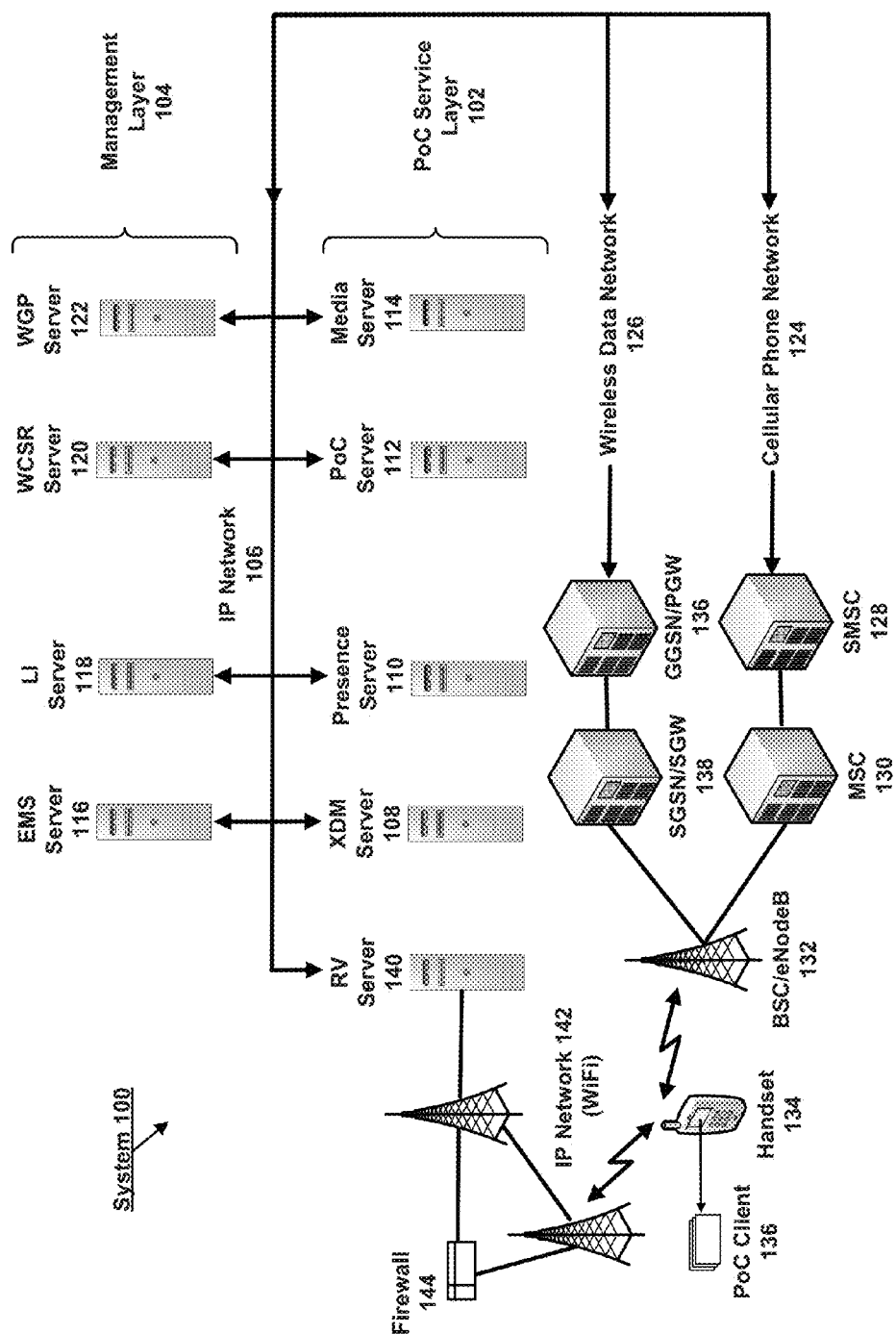
FIG. 1 illustrates the system architecture used in one embodiment of the present invention.

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

1 Overview

The present invention discloses a system for implementing advanced voice services in wireless communications networks that provides a feature-rich server architecture with a flexible client strategy. This system is an Open Mobile Alliance (OMA) standards-compliant solution that can be easily deployed, thereby enabling carriers to increase their profits, improve customer retention and attract new customers without costly upgrades to their network infrastructure.

This system is built on a proven, reliable all-IP (Internet Protocol) platform. The highly scalable platform is designed to allow simple network planning and growth. Multiple servers can be distributed across operator networks for broad geographic coverage and scalability to serve a large and expanding subscriber base.

1.1 Definitions

The following table defines various acronyms, including industry-standard acronyms, that are used in this specification.

| Acronym | Description |
| --- | --- |
| ATCA | Advanced Telecommunications Computing Architecture |
| DnD | Do not Disturb |
| DNS | Domain Name Server |
| GPRS | General Packet Radio Service |
| GSM | Global System for Mobile communications |
| HTTP | Hypertext Transport Protocol |
| HTTPS | Secure Hypertext Transport Protocol |
| IMSI | International Mobile Subscriber Identity |
| IP | Internet Protocol |
| IPA | Instant Personal Alert |
| MBCP | Media Burst Control Protocol |
| MCC | Mobile Country Code |
| MDN | Mobile Directory Number |
| MNC | Mobile Network Code |
| MS-ISDN | Mobile Station International Subscriber Directory Number |
| OMA | Open Mobile Alliance |
| PoC | Push-to-talk-over-Cellular |
| PGW | Packet GateWay |
| PTT | Push-To-Talk |
| RTCP | Realtime Transport Control Protocol |
| RTP | Realtime Transport Protocol |
| SDP | Session Description Protocol |
| SIM | Subscriber Identity Module |
| SIP | Session Initiation Protocol |
| SMMP | Short Message peer-to-peer Protocol |
| SMS | Small Message Service |
| SSL | Secure Sockets Layer protocol |
| SSRC | Synchronization SouRCe |
| TLS | Transport layer security protocol |
| UDP | User Datagram Protocol |
| URI | Uniform Resource Identifier |
| VoIP | Voice-over-IP |
| SGW | Serving GateWay |
| XCAP | XML Configuration Access Protocol |
| XDM | XML Document Management |
| XML | Extensible Mark-up Language |
| 4G/LTE | $4^{th}$ Generation/Long Term Evolution |

The following table defines various terms, including industry-standard terms, that are used in this specification.

| Term | Description |
| --- | --- |
| 1-1 PoC Session | A feature enabling a PoC User to establish a PoC Session with another PoC User. |
| Ad Hoc PoC Group Session | A PoC Group Session established by a PoC User to PoC Users listed on the invitation. The list includes PoC Users or PoC Groups or both. |
| Answer Mode | A PoC Client mode of operation for the terminating PoC Session invitation handling. |
| Controlling PoC Function | A function implemented in a PoC Server, providing centralized PoC Session handling, which includes media distribution, Talk Burst Control, Media Burst Control, policy enforcement for participation in the PoC Group Sessions, and participant information. |
| Corporate | These subscribers will only receive contacts and groups from a corporate administrator. That means they cannot create their own contacts and groups from handset. |
| Corporate Public | These subscribers receive contacts and groups from a corporate administrator in addition to user-created contacts and groups. |
| Corporate Administrator | A user who manages corporate subscribers, their contacts and groups. |
| Firewall | A device that acts as a barrier to prevent unauthorized or unwanted communications between computer networks and external devices. |
| Home PoC Server | The PoC Server of the PoC Service Provider that provides PoC service to the PoC User. |
| Instant Personal Alert | A feature in which a PoC User sends a SIP based instant message to a PoC User requesting a 1-1 PoC Session. |
| Law Enforcement Agency | An organization authorized by a lawful authorization based on a national law to request interception measures and to receive the results of telecommunications interceptions. |
| Lawful Interception | The legal authorization, process, and associated technical capabilities and activities of Law Enforcement Agencies related to the timely interception of signaling and content of wire, oral, or electronic communications. |
| Notification | A message sent from the Presence Service to a subscribed watcher when there is a change in the Presence Information of some presentity of interest, as recorded in one or more Subscriptions. |
| Participating PoC Function | A function implemented in a PoC Server, which provides PoC Session handling, which includes policy enforcement for incoming PoC Sessions and relays Talk Burst Control and Media Burst Control messages between the PoC Client and the PoC Server performing the Controlling PoC Function. The Participating PoC Function may also relay RTP Media between the PoC Client and the PoC Server performing the Controlling PoC Function. |
| PoC Client | A functional entity that resides on the User Equipment that supports the PoC service. |

-continued

| Term | Description |
| --- | --- |
| Pre-Arranged PoC Group Identity | A SIP URI identifying a Pre-Arranged PoC Group. A Pre-Arranged PoC Group Identity is used by the PoC Client, e.g., to establish PoC Group Sessions to the Pre-Arranged PoC Groups. |
| Pre-Arranged PoC Group | A persistent PoC Group. The establishment of a PoC Session to a Pre-Arranged PoC Group results in the members being invited. |
| Pre-Established Session | The Pre-Established Session is a SIP Session established between the PoC Client and its Home PoC Server. The PoC Client establishes the Pre-Established Session prior to making requests for PoC Sessions to other PoC Users. To establish a PoC Session based on a SIP request from the PoC User, the PoC Server conferences other PoC Servers or users to the Pre-Established Session so as to create an end-to-end connection. |
| Presence Server | A logical entity that receives Presence Information from a multitude of Presence Sources pertaining to the Presentities it serves and makes this information available to Watchers according to the rules associated with those Presentities. |
| Presentity | A logical entity that has Presence Information associated with it. This Presence Information may be composed from a multitude of Presence Sources. A Presentity is most commonly a reference for a person, although it may represent a role such as "help desk" or a resource such as "conference room #27". The Presentity is identified by a SIP URI, and may additionally be identified by a tel URI or a pres URI. |
| Public | These subscribers create and manage their contacts and groups. |
| Serving Server | A set of primary and secondary servers. |
| Subscription | The information kept by the Presence Service about a subscribed watcher's request to be notified of changes in the Presence Information of one or more Presentities. |
| Watcher | Any uniquely identifiable entity that requests Presence Information about a Presentity from the Presence Service. |
| WiFi | A wireless local area network (WLAN). |

2 System Architecture

FIG. 1 illustrates the system architecture used in the present invention. This architecture conforms to the Advanced Telecommunications Computing Architecture (ATCA) standard to support the advanced voice services of the present invention. ATCA is an open standards-based, high-availability telecommunications platform architecture.

Preferably, the system 100 includes one or more PoC Service Layers 102 and one or more Management Layers 104, each of which is comprised of one or more servers interconnected by one or more IP networks 106. Specifically, the PoC Service Layer 102 includes one or more XML Document Management (XDM) Servers 108, Presence Servers 110, PoC Servers 112, and Media Servers 114, while the Management Layer 104 includes one or more Element Management System (EMS) Servers 116, Lawful Intercept (LI) Servers 118, Web Customer Service Representative (WCSR) Servers 120, and Web Group Provisioning (WGP) Servers 122. These various servers are described in more detail below.

The PoC Service Layer 102 and Management Layer 104 are connected to one or more wireless communications networks, such as cellular phone networks 124 and wireless data networks 126, as well as one or more IP networks 106. Note that the cellular phone networks 124 and wireless data networks 126 may be implemented in a single network or as separate networks. The cellular phone network 124 includes one or more Short Message Service Centers (SMSCs) 128, Mobile Switching Centers (MSCs) 130, and Base Station Components (BSCs) 132, wherein the BSCs 132 include controllers and transceivers that communicate with one or more customer handsets 134 (also referred to as a mobile unit, mobile device, mobile station, mobile phone, cellular phone, etc.) executing a PoC Client 136. The wireless data network 126, depending on its type, e.g., GPRS or 4G/LTE, includes one or more Gateway GPRS Support Nodes (GGSNs) or Packet Gateways (PGWs) 136 and Serving GPRS Support Nodes (SGSNs) or Serving GateWays (SGWs) 138, which also communicate with customer handsets 134 via BSCs or eNodeBs 132.

Finally, in one embodiment of the present invention, the PoC Service Layer 102 and Management Layer 104 are connected to one or more RendeVous (RV) Servers 140, which are coupled to one or more external IP networks 142, such as WiFi networks 142, possibly using one or more Firewalls 144, in order to communicate with one or more PoC Clients 136 on one or more handsets 134. Traffic to and from the wireless data networks 126 also traverses the RV Servers 140.

2.1 Cellular Phone Network

The PoC Service Layer 102 interacts with the SMSC 128 on the cellular phone network 124 to handle Short Message Service (SMS) operations, such as routing, forwarding and storing incoming text messages on their way to desired endpoints.

2.2 Wireless Data Network

The PoC Service Layer 102 also interacts with the following entities on the wireless data network 126:
  The GGSN/PGW 136 transfers IP packets between the PoC Client 136 and the various servers:
    SIP/IP signaling messages between the PoC Server 112 and PoC Client 136 for control traffic exchange (i.e., control packets) for PoC call sessions.
    RTP/IP, RTCP/IP and MBCP/IP packets between the Media Server 114 and PoC Client 136 for bearer traffic exchange (i.e., voice packets) for PoC call sessions.
    SIP/IP signaling messages between the Presence Server 110 and PoC Client 136 for presence information.

XCAP/HTTP/IP and SIP/IP signaling between the XDM Server 108 and PoC Client 136 for document management.

The SMSC 128 handles authentication:

The XDM Server 108 communicates with the SMSC 128 via SMPP/IP for receiving the authentication code required for PoC Client 136 activation from the handset 134.

2.3 WiFi Network

The PoC Service Layer 102 also interacts with the following entities on the WiFi network 142:

The RV Server 140 transfers IP packets between the PoC Client 136 and the various servers:

SIP/IP signaling messages between the PoC Server 112 and PoC Client 136 for control traffic exchange (i.e., control packets) for PoC call sessions.

RTP/IP, RTCP/IP and MBCP/IP packets between the Media Server 114 and PoC Client 136 for bearer traffic exchange (i.e., voice packets) for PoC call sessions.

SIP/IP signaling messages between the Presence Server 110 and PoC Client 136 for presence information.

XCAP/HTTP/IP and SIP/IP signaling between the XDM Server 108 and PoC Client 136 for document management.

SIP/IP signaling messages between the XDM Server 108 and PoC Client 136 for receiving the authentication code required for PoC Client 136 activation from the handset 134.

2.4 PoC Service Layer Elements

As noted above, the PoC Service Layer 102 is comprised of the following elements:

PoC Server 112,
Media Server 114,
Presence Server 110,
XDM Server 108, and
RV Server 140.

These elements are described in more detail below.

2.4.1 PoC Server

The PoC Server 112 handles the PoC call session management and is the core for managing the PoC services for the PoC Clients 136 using SIP protocol. The PoC Server 112 implements a Control Plane portion of Controlling and Participating PoC Functions. A Controlling PoC Function acts as an arbitrator for a PoC Session and controls the sending of control and bearer traffic by the PoC Clients 136. A Participating PoC Function relays control and bearer traffic between the PoC Client 136 and the PoC Server 112 performing the Controlling PoC Function.

2.4.2 Media Server

The Media Server 114 implements a User Plane portion of the Controlling and Participating PoC Functions. The Media Server 114 supports the Controlling PoC Function by duplicating voice packets received from an originator PoC Client 136 to all recipients of the PoC Session. The Media Server 114 also supports the Participating PoC Function by relaying the voice packets between PoC Clients 136 and the Media Server 114 supporting the Controlling PoC Function. The Media Server 114 also handles packets sent to and received from the PoC Clients 136 for floor control during PoC call sessions.

2.4.3 Presence Server

The Presence Server 110 implements a presence enabler for the PoC Service. The Presence Server 110 accepts, stores and distributes Presence Information for Presentities, such as PoC Clients 136.

The Presence Server 110 also implements a Resource List Server (RLS), which accepts and manages subscriptions to Presence Lists. Presence Lists enable a "watcher" application to subscribe to the Presence Information of multiple Presentities using a single subscription transaction.

The Presence Server 110 uses certain XDM functions to provide these functions, which are provided by XDM Server 108.

2.4.4 XDM Server

The XDM Server 108 implements an XDM enabler for the PoC Service. The XDM enabler defines a common mechanism that makes user-specific service-related information accessible to the functions that need them. Such information is stored in the XDM Server 108 where it can be located, accessed and manipulated (e.g., created, changed, deleted, etc.). The XDM Server 108 uses well-structured XML documents and HTTP protocol for access and manipulation of such XML documents. The XDM Server 108 also connects to the operator SMSC 128 for the purposes of PoC Client 136 activation using SMS. In addition, the XDM Server 108 maintains the configuration information for all PoC subscribers.

2.4.5 RV Server

The RV Server 140 implements a interworking solution for the PoC Service to communicate via one or more IP network 142 access points to the PoC Clients 136. Specifically, the RV Server 140 provides PoC Service over an IP network 142 (such as an external WiFi network), as well as the wireless data networks 126, and supports a seamless user experience while the transport of IP control messages and IP voice data is transitioned between different types of wireless communications networks, such as wireless data networks 126 comprising cellular data packet networks and IP networks 142. The RV Server 140 also resolves security concerns that arise with such interworking solutions.

This is necessary because the quality, performance and availability of the wireless data networks 126 typically vary from location to location based on various factors. In addressing these issues, the interworking solution implemented by the RV Server 140 provides following benefits:

PoC Services becomes available even in those locations where a wireless data network 126 is not available, but where a general purpose IP network 142 is available. This is particularly more useful in enhancing in-building coverage for the PoC Service.

By connecting over the IP network 142, the available IP bandwidth, quality and performance can be more streamlined and controlled since the IP network 142 (typically) has a greater capacity and throughput as compared to the wireless data network 126, which is more shared in nature.

By utilizing the greater available bandwidth over the IP network 142, as compared to the wireless data network

126, it is possible to provide additional services (such as sharing large files) which otherwise is inefficient and costly on wireless data networks 126.

These and other aspects of the interworking solution are described in more detail below.

2.5 Management Layer Elements

As noted above, the Management Layer 104 is comprised of the following elements:
Element Management System (EMS) Server 116,
Lawful Intercept (LI) Server 118,
Web Group Provisioning (WGP) Server 122, and
Web Customer Service Representative (WCSR) Server 120.

These elements are described in more detail below.

2.5.1 EMS Server

The EMS Server 116 is an operations, administration, and maintenance platform for the system 100. The EMS Server 116 enables system administrators to perform system-related configuration, network monitoring and network performance data collection functions. The EMS Server 116, or another dedicated server, may also provide billing functions. All functions of the EMS Server 116 are accessible through a web-based interface.

2.5.2 LI Server

The LI Server 118 is used for tracking services required by various Lawful Enforcement Agents (LEAs). The LI Server 118 generates and pushes an IRI (Intercept Related Information) Report for all PoC Services used by a target. The target can be added or deleted in to the PoC Server 112 via the LI Server 118 using a Command Line Interface (CLI).

2.5.3 WGP Server

The WGP Server 122 provides a web interface for corporate administrators to manage PoC contacts and groups. The web interface includes contact and group management operations, such as create, delete and update contacts and groups.

2.5.4 WCSR Server

The WCSR Server 120 provides access to customer service representatives (CSRs) for managing end user provisioning and account maintenance.

Typically, it supports the following operations:
Create Subscriber account,
Update Subscriber account,
Delete Subscriber account,
Mobile number change command,
View Subscriber details (MDN, Group, Group members),
Manage Corporate Accounts,
Add CSR account,
Delete CSR account.

3 System Functions

The following sections describe various functions performed by each of the components of the system architecture.

3.1 PoC Service Layer

3.1.1 PoC Server

The PoC Server 112 controls PoC call sessions, including 1-1, Ad Hoc and Pre-Arranged PoC call sessions. The PoC Server 112 also controls Instant Personal Alerts.

The PoC Server 112 expects the PoC Clients 136 to setup "pre-established sessions" at the time of start up and use these sessions to make outgoing PoC calls. The PoC Server 112 also uses pre-established sessions to terminate incoming PoC calls to the PoC Clients 136. The PoC Clients 136 are setup in auto-answer mode by default. The use of pre-established sessions and auto-answer mode together allow for faster call setup for PoC call sessions.

The PoC Server 112 allocates and manages the media ports of the Media Services 114 associated with each SIP INVITE dialog for pre-established sessions and controls the Media Servers 114 to dynamically associate these ports at run time for sending RTP packets during PoC call sessions. Media ports are assigned and tracked by the PoC Server 112 at the time of setting up pre-established sessions. The PoC Server 112 instructs the Media Server 114 to associate the media ports of various subscribers dynamically into a session when a PoC call is originated and this session is maintained for the duration of the call. The PoC Server 112 also controls the floor states of the various participants in a PoC call session by receiving indications from the Media Servers 114 and sending appropriate requests back to the Media Servers 114 to send MBCP messages to the participants in the PoC call. The Media Server 114 uses the media ports association and current talker information to send the RTP packets from the talker's media port onto the listeners' media ports.

In addition, the PoC Server 112 handles the incoming and outgoing Instant Personal Alerts (IPAs) by routing SIP MESSAGE requests to the PoC Clients 136 and remote PoC Servers 112 for final delivery as applicable.

The PoC Server 112 uses static and dynamic data related to each subscriber to perform these functions. Static data include subscriber profile, contacts and groups. Dynamic data include the subscriber's registration state, PoC settings and SIP dialog states are maintained only on the PoC Server 112.

3.1.2 Media Server

The Media Server 114 handles the flow of data to and from the PoC Clients 136 as instructed by the PoC Server 112. Each Media Server 114 is controlled by a single PoC Server 112, although multiple Media Servers 114 may be controlled by a PoC Server 112 simultaneously.

The Media Server 114 is completely controlled by the PoC Server 112. As noted above, even the media ports of the Media Server 114 are allocated by the PoC Server 112 and then communicated to the Media Server 114. Likewise, floor control requests received by the Media Server 114 from PoC Clients 136 are sent to the PoC Server 112, and the PoC Server 112 instructs the Media Server 114 appropriately. Based on these instructions, the Media Server 114 sends floor control messages to the PoC Clients 136 and sends the RTP packets received from the talker to all the listeners.

3.1.4 Presence Server

The Presence Server 110 accepts presence information published by PoC Clients 136, as well as availability information received from other entities. The Presence Server 110 keeps track of these presence states and sends notifications to various "watcher" applications whenever a presence state changes. The Presence Server 110 maintains separate subscriptions for each watcher and dynamically applies the presence authorization rules for each watcher independently.

The Presence Server 110 also accepts resource list subscriptions from the watchers, which identify one or more entities ("Presentities") whose presence should be monitored. The Presence Server 110 then aggregates all the presence information into one or more presence notifications transmitted to each watcher. This allows watchers to subscribe to large number of Presentities without putting strain on the network as well as client and server resources.

3.1.5 XDM Server

The XDM Server 108 performs client authentication and subscription functions. The XDM Server 108 also stores subscriber and group information data. The XDM Server 108 also interacts with the SMSC 128 to receive PoC Client 136 activation commands.

All subscriber provisioning and CSR operations in the XDM Server 108 are performed through the WCSR Server 120, while corporate administrative operations, as well as contacts and group management, are handled through the WGP Server 122.

The XDM Server 108 includes a Subscriber Profile Manager module that provides subscriber management functionality, such as creation, deletion and modification of subscriber profiles. The subscriber profile includes data such as the MDN, subscriber name, subscriber type, etc. This also determines other system-wide configurations applicable for the subscriber including the maximum number of contacts and groups per subscriber and the maximum number of members per group.

The XDM Server 108 includes a Subscriber Data Manager module that manages the subscriber document operations, such as contact and group management operations, initiated by the PoC Clients 136 or the WGP Server 122.

3.1.6 RV Server

The RV Server 140 performs interworking for the PoC service by communicating with the PoC Clients 136 via one or more IP networks 142 and/or wireless data networks 126.

The PoC Client 136 sets up one or more connections using the configured Fully Qualified Domain Name (FQDN), or absolute domain name, of the RV Server 140, which may be publicly exposed to the Internet. Secure transport protocols may (or may not) be used for the connections across the IP networks 142 and/or wireless data networks 126. For example, the PoC Clients 136 may use the Transport Layer Security (TLS) and/or Secure Sockets Layer (SSL) protocols for encrypting information transmitted over the connections between the PoC Client 136 and the RV Server 140.

In such an embodiment, all SIP signaling and voice data (RTP and RTCP) would be tunneled over the SSL/TLS connections between the PoC Client 136 and the RV Server 140. XCAP signaling may be transmitted using a Hypertext Transfer Protocol Secure (HTTPS) protocol, which results from layering the Hypertext Transfer Protocol (HTTP) on top of the SSL/TLS connections, thus adding the security capabilities of SSL/TLS to standard HTTP communications.

Consequently, the RV Server 140 performs as an encryption/decryption off-loader that provides end-to-end encryption for all traffic transmitted to and from the PoC Client 136. Specifically, all of the traffic sent to the PoC Client 136 is encrypted at the RV Server 140 and all the traffic received from the PoC Client 136 is decrypted at the RV Server 140.

The RV Server 140 terminates the SSL/TLS connections and aggregates or dis-aggregates the PoC Client 136 traffic to the appropriate Servers 108, 110, 112, 114, 116, 118, 120 and 122. Specifically, the RV Server 140 acts as an intelligent traffic distributor for SIP signaling and RTP/RTCP traffic by forwarding the traffic to the appropriate Servers 108, 110, 112, 114, 116, 118, 120 and 122, depending on the message types and the availability of the Servers 108, 110, 112, 114, 116, 118, 120 and 122. Consequently, the RV Server 140 is a single point-of-contact for all traffic to and from the PoC Clients 136 at an IP transport layer via the IP networks 142 and/or wireless data networks 126.

Typically, the SSL/TLS connections are persisted and used for any bidirectional data transfer between the RV Server 140, or other Servers, and the PoC Clients 136. Thus, a PoC Client 136 maintains an "always-on" connection with the RV Server 140 by periodically sending "keep-alive" messages over the SSL/TLS connections.

The system also simplifies the traversal of the Firewalls 144. Preferably, the PoC Clients 136 establish the SSL/TLS connections to the RV Server 140 over TCP port 443, which is typically used for HTTPS communications. This allows for Firewall 144 traversal on most corporate networks, because the Firewall 144 facing (exposed to) the Internet is default configured to allow (and not deny) the SSL/TLS connections on TCP port 443. As a result, the system does not require that any special changes be made to the Firewall 144, such as those changes typically required for VoIP deployments in corporate networks. Instead, the traffic with the PoC Clients 136 is routed over SSL/TLS connections on TCP port 443, which can traverse through the Firewalls 144 seamlessly.

3.2 Management Layer

3.2.1 EMS Server

The EMS Server 116 is the central management entity in the system and includes the following modules:
- A central application where all management business logic resides.
- A web server for serving the network operator's internal users. A corresponding client provides a user interface for viewing fault, configuration, performance and security information.
- A subsystem is provided for health monitoring of network elements deployed in the system and also to issue any maintenance commands as applicable.

3.2.2 WCSR Server

The WCSR Server 120 provides a web user interface for customer service representatives (CSRs) to carry out various operations. The web user interface provides access to CSRs for managing subscriber provisioning and account maintenance. Typically, it supports the following operations.
- Create Subscriber account,
- Update Subscriber account,
- Delete Subscriber account,
- Mobile number change command,
- Forced synchronization of a Subscriber,
- Deactivate a Subscriber account,
- Reactivate a Subscriber account,
- View Subscriber details, such as MDN, Group, Group members.

3.2.3 WGP Server

The WGP Server 122 allows provides for central management of all corporate subscribers and associated contacts and groups within a corporation. The WGP Server 122 allows corporate administrators to manage contacts and groups for corporate subscribers.

The WGP Server 122 includes a Corporate Administration Tool (CAT) that is used by corporate administrators to manage contacts and groups of corporate subscribers. The CAT has a Web User Interface for corporate administrators that supports the following operations:
  group management,
  contact management, and
  associations between corporations.

With regard to group management, the CAT of the WGP Server 122 includes the following operations:
  Create, Update, Delete and View Corporate Groups,
  Add, Update, Delete and View Members of a Corporate Group,
  Manage Subscribers,
  Activate and Deactivate a Corporate Subscriber,
  Change a Subscriber type from "Corporate" to "Corporate And Public", and vice versa,
  Restrict Availability, i.e., do not allow subscriber to change their presence status, and
    Manage number porting or name change via phone assignment.

With regard to contact management, the CAT of the WGP Server 122 includes the following operations:
  Phone list management,
  N×N Contact Add (e.g., N contacts may be members of N groups),
  Add, Update, Delete and View Contacts for a specific subscriber, and
  Export and Import contacts at both the subscriber and corporate level.

With regard to associations between corporations, the CAT of the WGP Server 122 includes the following operations:
  Corporate Associations Attributes,
  Association Name,
  Association ID,
  Association Mode (e.g., One-way, Two-way), and
  Restricted List.

Once the association is created and accepted, corporate administrators can create contacts and groups using the association policies. Administrators from other corporations can view the contacts, and may or may not have the capability to add, update or delete the contacts.
  Corporate ID associated per corporate subscriber,
  Central management of corporate subscribers, groups, and contacts,
  Intercorporate associations, including contacts and whitelists,
  Phone list management (e.g., N×N contact add),
  Restrict Availability, and
  Import and Export contacts at both the subscriber and corporate level.

Note that, if the association is deleted, then usually all intercorporate contacts and group members will be deleted.

3.3 PoC Client

The PoC Client 136 is an OMA-compatible client application executed on a handset 134. The following features are supported by the PoC Client 136:
  PoC Calls and Instant Personal Alert,
  Presence, and
  Contact and Group Management.

The PoC Client 136 includes a database module, a presence module, an XDM module and a client module.

The database module stores configuration information, presence information, contact and group information, user settings, and other information in an optimized and persistent way. Information is preserved when the user unregisters with the PoC Server 112 or power cycles the device. The database module also has a mechanism to reset the data and synchronize from the XDM Server 108 when the data in the database module is corrupt or unreadable.

The presence module creates and maintains the presence information for the subscriber. Typically, the presence information supports Available, Unavailable and Do-not-Disturb (DnD) states. The presence module also subscribes to the Presence Server 110 as a "watcher" of all contacts in the handset 134 and updates the user interface of the handset 134 whenever it receives a notification with such presence information.

The XDM module communicates with the XDM Server 108 for management of contacts and groups. The XDM module may subscribe with the XDM Server 108 to send and receive any changes to the contacts or group list, and updates the user interface of the handset 134 based on the notifications it receives from the XDM Server 108.

The client module provides the most important function of making and receiving PoC calls. To support PoC calls, the client module creates and maintains pre-established sessions with the PoC Server 112. The client module supports 1-1, Ad Hoc and Pre-Arranged PoC calls. The client module also supports sending and receiving Instant Personal Alerts (IPA).

4 State Diagram for a PoC Call Session

Figure 2:
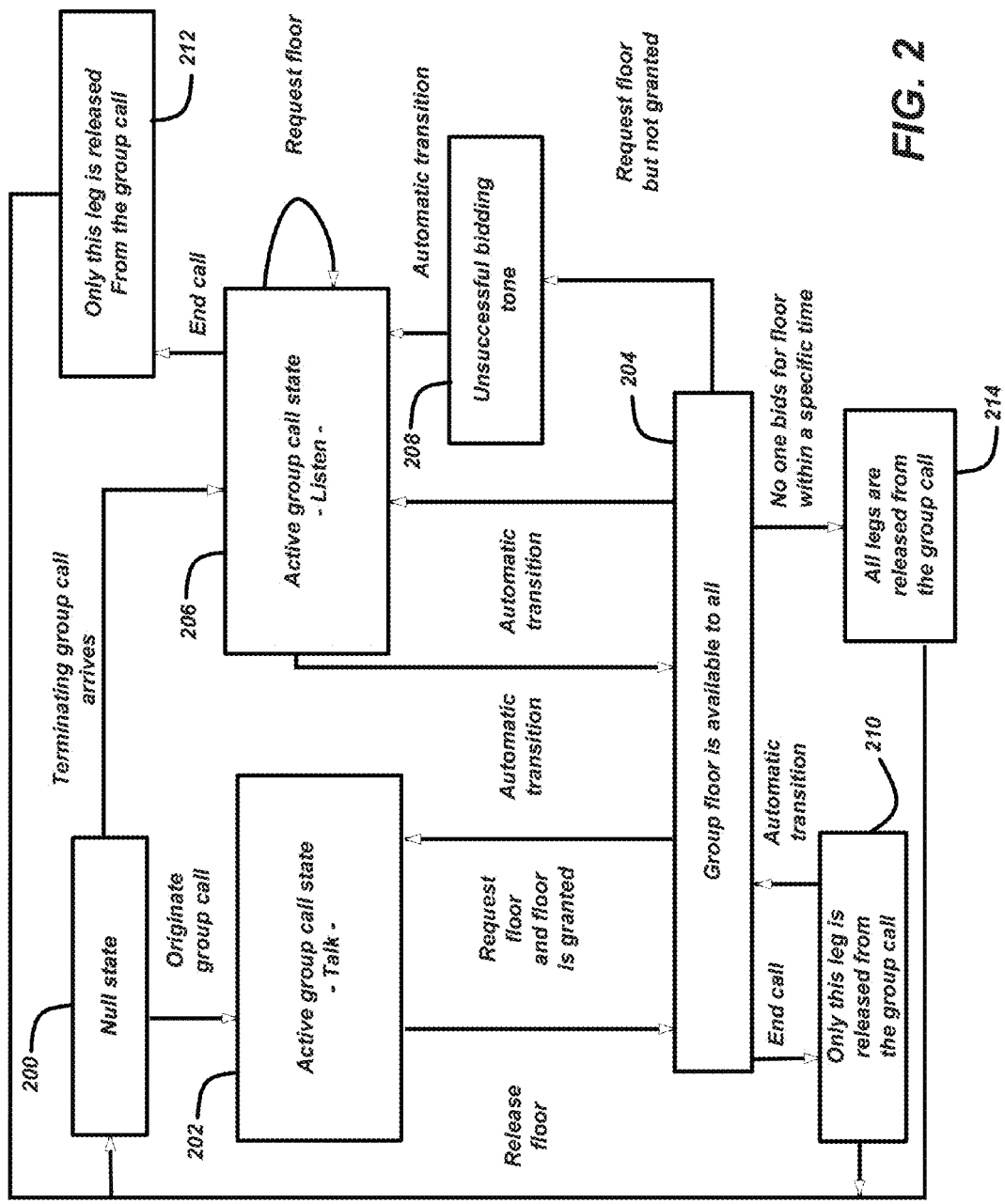
FIG. 2 is a state diagram that illustrates the operation of a PoC session according to one embodiment of the present invention.

FIG. 2 is a state diagram that illustrates the operation of a PoC call session according to one embodiment of the present invention.

State 200 represents a PoC Client 136 in a NULL state, i.e., the start of the logic. A transition out of this state is triggered by a user making a request to originate a PoC call, or by a request being made to terminate a PoC call at the handset 134. A request to originate a PoC call is normally made by pressing a PoC button, but may be initiated in this embodiment by dialing some sequence of one or more numbers on the handset 134 that are interpreted by the PoC Server 112, by pressing one or more other keys on the handset 134 that are interpreted by the PoC Server 112, by speaking one or more commands that are interpreted by the PoC Server 112, or by some other means.

State 202 represents the PoC Client 136 in an active group call state, having received a "floor grant" (permit to speak). In this state, the user receives a chirp tone that indicates that the user may start talking. The user responds by talking on the handset 134. The handset 134 uses the reverse traffic channel to send voice frames to the Media Server 114, and the Media Server 114 switches voice frames only in one direction, i.e., from talker to one or more listeners, which ensures the half-duplex operation required for a PoC call.

State 204 represents the group "floor" being available to all members of the group. When the talking user signals that the floor is released, the floor is available to all group members. The signal to release the floor is normally made by releasing the PoC button, but may be performed in this embodiment by voice activity detection, e.g., by not speaking for some time period (which is interpreted by the PoC Server 112 as a release command). All members of the group receive a "free floor" tone on their handset 134. A user who requests the floor first (in the "free-floor" state), for example, is granted the floor, wherein the system 100 sends a chirp tone to the successful user. The signal to request the floor is normally made by pressing the PoC button, but may be performed in this embodiment by voice activity detection, e.g., by speaking for some time period (which is interpreted by the PoC Server 112 as a request command).

State 206 represents the PoC Client 136 being in an active group call state. In this state, the user is listening to the group call. If a non-talking user requests the floor in the active group call state, the user does not receive any response from the system 100 and remains in the same functional state. As noted above, the signal to request the floor is normally made by pressing the PoC button, but may be performed in this embodiment by voice activity detection, e.g., by speaking for some time period (which is interpreted by the PoC Server 112 as a request command).

State 208 represents a user receiving an "unsuccessful bidding" tone on his handset 134, after the user has requested the floor, but was not granted the floor, of the group call. The user subsequently listens to the voice message of the talking user.

Non-talking users (including the talking user who must release the floor to make it available for others) can request the system 100 to end their respective call legs explicitly.

State 210 represents a terminating leg being released from the call after the user ends the call.

State 212 also represents a terminating leg being released from the call after the user ends the call.

State 214 represents all terminating legs being released from the call when no user makes a request for the within a specified time period, or after all users have ended their respective call legs.

5 Effective Presence for Push-to-Talk-Over-Cellular (PoC) Networks 5.1 Introduction Presence related messages for PoC calls place a significant burden on the system 100 due to increased message traffic, in addition to increased demands on server 110 resources, and increased battery usage on mobile handsets 134, as the number of contacts per subscriber and watcher list grows.

Presence related messages generally comprise the following:

Change in network presence of a PoC Client 136 due to login (Online) or logout (Offline) and Temporary Unavailability (TU) detection by the Presence Server 110; and Change in self-availability status by a PoC Client (Available, DnD, etc.).

Every time there is a change in the presence status of a PoC Client 136, an update message is typically sent to all members in the contact/group list of the concerned PoC Client 136.

Such update messages create significant message traffic in the system 100, especially in the following cases:

a PoC Client 136 with a large number of contacts (e.g., 1000 contacts), or simultaneous or near-simultaneous change of presence of a large number of PoC Clients 136 (e.g., morning or evening time when users login or logout of the system 100).

Presence related signaling traffic at extreme levels results in increased network load, demands significant server/hardware resources, and also leads to increased battery usage on handsets 134. An effective approach to optimization of presence traffic is required to reduce network load, server resources and conserve handset 134 battery life.

In the present invention, the Presence Server 110 performs an effective presence delivery method that reduces presence notifications delivered to the handsets 134 participating in the advanced voice services, while ensuring that the presence notifications relevant to the handsets 134 are available when the advanced voice services are invoked by the handsets 134.

5.2 Presentity, Presence Status and Watcher

Effective presence is provided for one or more Presentities. A Presentity is a user publishing his/her presence status to all of his contacts/watchers via the Presence Server 110 and PoC Client 136.

The presence status refers to the current status of a Presentity. A status change can be triggered by the user (e.g., by indicating that the user is available, or away, or DnD, etc.), and a status change can be automatically detected by the system 100 (e.g., detecting whether the PoC Client 136 is online, offline, temporarily unavailable, etc.).

A watcher is one interested in the presence status information of his/her contacts. Generally, the latest presence status information is received via presence notification messages or updates.

5.3 Impact of Presence Traffic in PoC 5.3.1 Impact of Excessive Presence Traffic Excessive presence traffic results in inefficient usage of network resources, including signaling costs, increased server 110 resource usage, and increased battery usage in handsets 134.

With regard to signaling costs, cellular phone networks 124, wireless data networks 126, and WiFi IP networks 104 are designed to optimize usage of the wireless spectrum and typically allocate wireless spectrum for communications only on an as-needed basis. The whole mechanism involves very complex logic for signaling and resource assignment. These networks 104, 124, 126 are typically optimized for a continuous stream of data periodically (at fixed time intervals) or for short duration of time (burst traffic). Intermittent data delivery to the handsets 134 causes very inefficient usage of network 104, 124, 126 resources.

With regard to increased server resource usage, Presence Server 110 resources such as processing cycles, memory, storage, etc., are utilized to process presence status updates and to subsequently generate a large number of notifications.

With regard to increased battery usage, mobile devices 134 are optimized to use the radio transmitter/receiver only when data transmission is required. Receiving a high frequency of presence updates causes inefficient usage of battery usage in the devices 134.

5.3.2 Source of High Presence Traffic

In some Push-to-Talk (PTT) systems, such as the NEXTEL system, there is no presence notification. This eliminates the large amount of network traffic related to presence notifications. However, users are do not know, before placing a PTT call, if a contact is available or not. In other systems, such as the PoC system (R7.x) provided by Kodiak Networks, Inc., the assignee of the present invention, a presence notification is sent to the PoC Client 136 whenever there is a change in presence status of any member of the contact list in the PoC Client 136. Typically, due to the linkage of the presence function with the contact list of the PoC Client 136, the average number of watchers receiving presence notifications pertaining to that PoC Client 136 is proportionate to the average contact list size among all PoC Clients 136 in the system 100. Note that, in this case, or even in case of a PoC Client 136 with 1000 contacts, where the user has invoked any PoC service with, e.g., only 10 contacts, the PoC Client 136 will receive presence status update messages pertaining to all 1000 contacts.

In enterprises with large numbers of groups and contacts, where users login and logout around same time on a day, the volume of presence messages can overwhelm the system 100. Further, considering that a typical PoC user communicates with a small number of other PoC users via PoC calls, sending presence notifications to all groups and contacts at all times is wasteful from the perspective of network traffic, as well as Presence Server 110 capacity.

5.4 Effective Presence Methods

An effective presence delivery mechanism is comprised of a set of methods, which together reduce the number of presence notifications delivered to the watchers and yet ensure that presence information that is most relevant to the PoC Client 136 is available when required. In particular, the presence status of a contact is considered relevant to the PoC Client 136, when invoking a PoC service towards that contact.

Effective presence delivery methods are categorized into two different types of methods: predictive and reactive methods.

Using predictive methods, the Presence Server 110 determines a priori whether the presence information is relevant to the PoC Client 136. Predictive methods include the following:

(1) Relevant Contact List: wherein the list of contacts whose presence information is most relevant to the PoC Client 136 is determined from several data sources including the following:
  (a) Frequently Used Contact List: wherein the list of contacts that the PoC Client 136 is most likely to call is determined from the user's call history.
  (b) Recently Used Contact List: wherein the Presence Server 110 delivers accurate real-time presence information for recently used contacts of the user.
  (c) User-Configured Favorite List: wherein the user configures a favorite contacts list that includes the set of contacts that the user intends to make use of frequently.
  (d) PoC Contact List: wherein the user orders the PoC contact list to reflect the priority of presence delivery.

(2) Presence traffic discrimination: wherein some types of presence traffic, such as DnD notifications, are considered more relevant to the user than other types of traffic, such as network connectivity related presence state changes.

(3) Periodic synchronization: wherein presence information mismatch in the PoC Client 136 is rectified by a Periodic Presence Synchronization Procedure.

Using reactive methods, means are provided to rectify presence status mismatches by delivering the missing presence information to the PoC Client 136 as soon as possible in order to minimize any inconvenience caused to the user by such out-of-sync presence information. This includes the following methods:

(1) User activity linked presence: wherein the Presence Server 110 tracks the call and other PoC service related activity of the PoC Client 136 and provides the presence information of the contact when the PoC Client 136 makes or receives a PoC services involving that contact.

(2) On-demand presence: wherein the PoC Client 136 is provided means to explicitly request for the missing presence information.

(3) Presence retrieval on contact list scrolling or searching: wherein the PoC Client 136 obtains accurate presence information from the Presence Server 110 for a subset of the contacts in the PoC Client 136, when the user is scrolling or searching the contact list on the handset 134.

5.4.1 Presence Traffic Optimization Using Predictive Methods

5.4.1.1 Relevant Contacts

Figure 3:
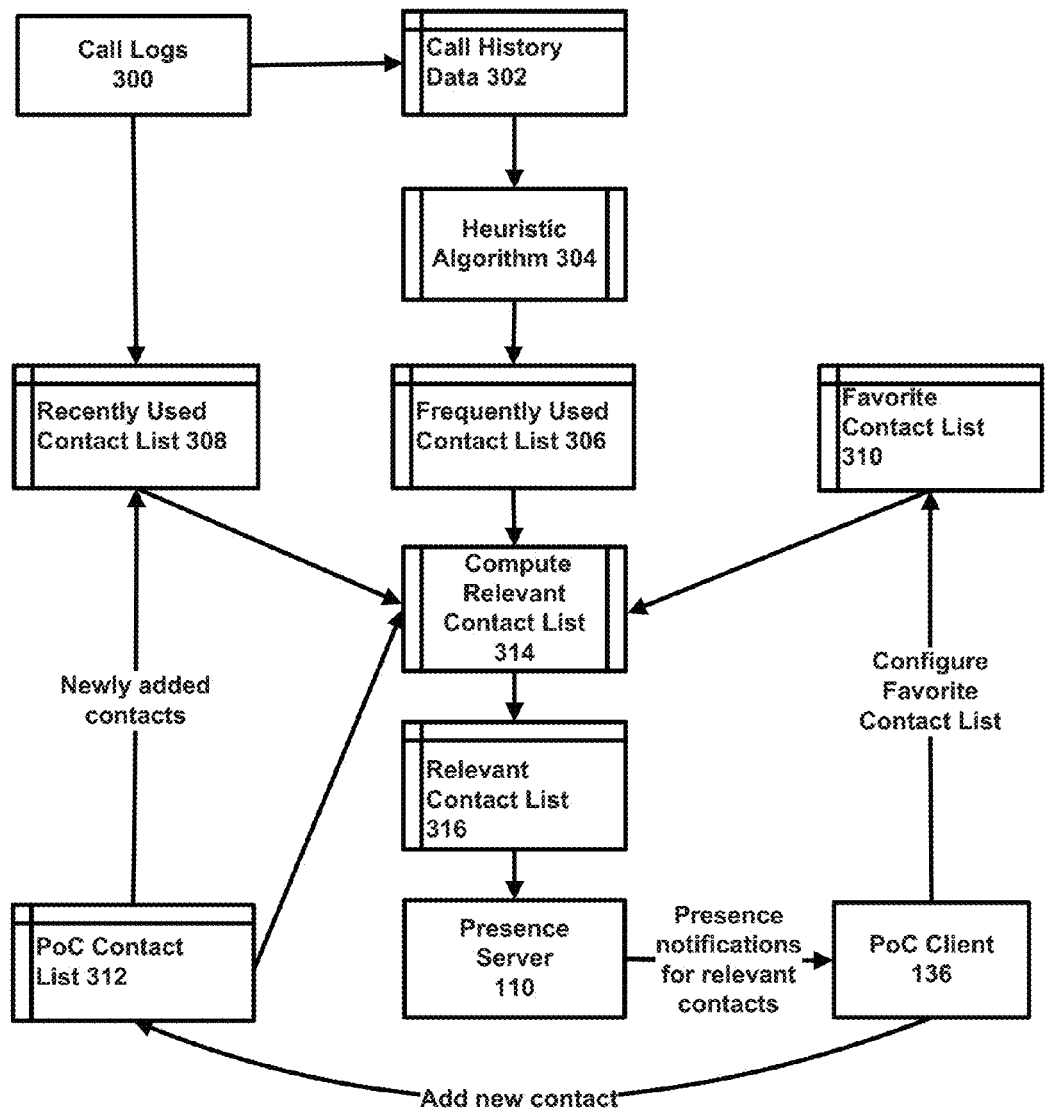
FIG. 3 is a flowchart that illustrates an optimization method known as Relevant Contact List Usage that relieves the problems associated with presence updates for PoC Clients with large contact lists by heuristically limiting real-time presence updates to relevant contacts only.

FIG. 3 is a flowchart that illustrates an optimization method known as Relevant Contact List Usage that relieves the problems associated with presence updates for PoC Clients 136 with large contact lists by heuristically limiting real-time presence updates to relevant contacts only.

Call Logs 300 from any or all of the components of the system 100 are used for maintaining Call History Data 302. Details related to calls originated and received by a PoC Client 136 over a configurable period of time (e.g., 3 months) are accumulated in the Call History Data 302. Stale call history records are purged periodically from the Call History Data 302.

The information in the Call History Data 300 is used by a Heuristic Algorithm 304 implemented in the Presence Server 110 for periodically computing the Frequently Used Contacts List 306. The Heuristic Algorithm 304 for computing the Frequently Used Contact List 306 is further described in FIG. 4.

The Call Logs 300 are also used for maintaining the Recently Used Contact List 308. Communications between PoC Clients 136 tends to occur in bursts. Therefore, the user is very likely to make or receive a call involving a recently used contact.

There are two ways in which a contact is added to the Recently Used Contact List 308:

1. When the user initiates a call or IPA towards a contact or receives a call or IPA from a contact, the contact is included into the user's Recently Used Contact List 308.

2. When the PoC user adds a new contact to the contact list, the new contact is added into Recently Used Contact List 308.

The Favorite Contact List 310 is configured by the user on the PoC Client 136, in order to provide easy access to these contacts. Users typically place their most frequently used contacts into the Favorite Contact List 310.

Using multiple data sources, including the Frequently Used Contact List 306, Recently Used Contact List 308, Favorite Contact List 310, and PoC Contact List 314 (which originates from the PoC Client 136, but is maintained on the Presence Server 110), the Presence Server 110 computes, at Block 314, the Relevant Contact List 316. This computation is described in more detail in FIG. 5.

The Relevant Contact List 316 is used by the Presence Server 110 to provide accurate presence information in real-time to the PoC Client 136.

5.4.1.2 Heuristic Algorithm

Figure 4:
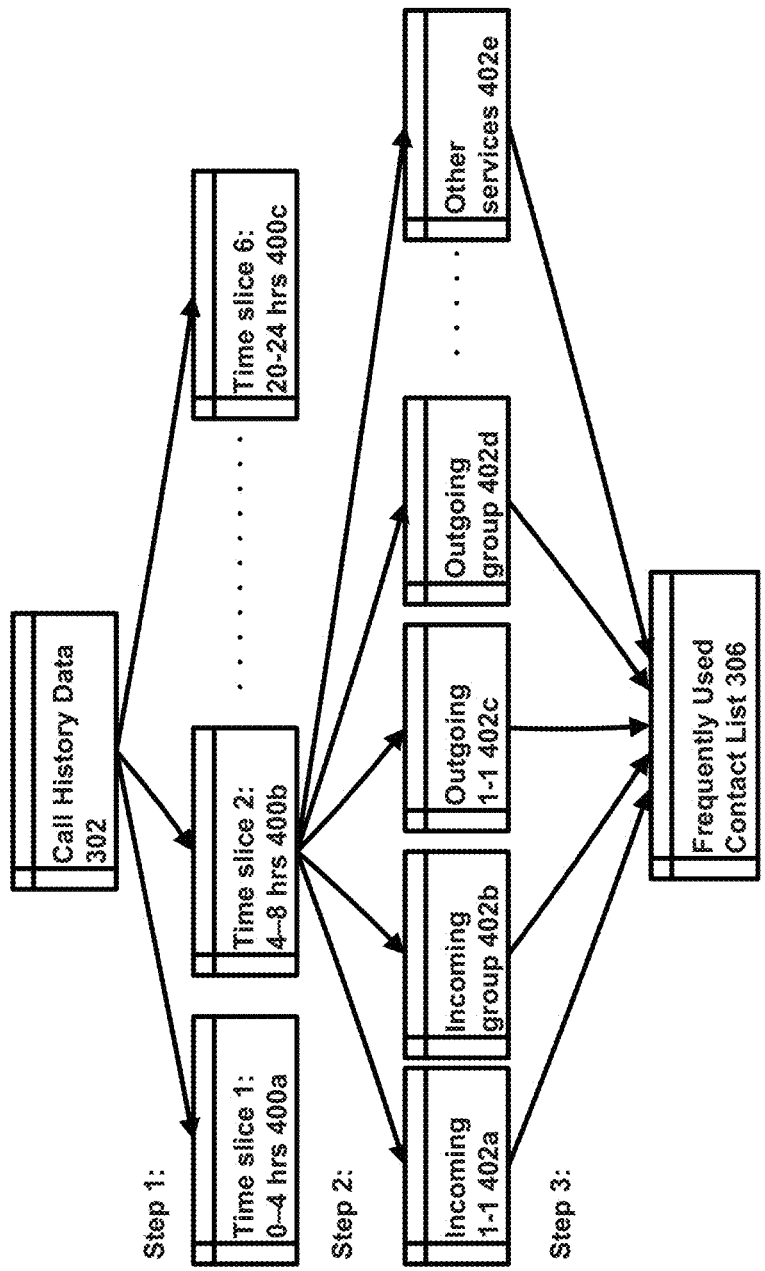
FIG. 4 illustrates the Heuristic Algorithm for computing the Frequently Used Contact List according to one embodiment of the present invention.

FIG. 4 illustrates the Heuristic Algorithm 304 for computing the Frequently Used Contact List 306 according to one embodiment of the present invention. This computation may be performed by the Presence Server 110 (or by some other server).

Step 1 splits or partitions the Call History Data 302 into separate time slices 400a-c across the period for which Call History Data 302 is available. In this example, time slices 400a-c for a period of 24 hours or 1 day are shown merely for the purposes of illustration. The number of time slices 400a-c and the period of the time slices 400a-c can be configured as desired. Additional factors such as user's location can also be applied for selecting the most relevant subset of the Call History Data 302.

In Step 2, after selecting the most relevant time slice 400b of the Call History Data 302, based on a chosen partitioning policy (time-slice, location, etc.), the selected time slice 400b is further split into subsets 402a-e, based on some criteria. In this example, the selected time slice 2: 4-8 hrs 400b is split into subsets 402a-e corresponding to service types that comprise incoming 1-to-1 calls 402a, incoming group calls 402b, outgoing 1-to-1 calls 402c, outgoing group calls 402d, and other services 402e.

Step 3 forms the Frequently Used Contacts List 306 by incorporating or consolidating the data from the various subsets 402a-e, usually based on a weighting for each subset 402a-e, wherein the weightings for the subsets 402a-e are configurable. For example, all subsets 402a-e, and thus all service types, may be assigned equal weightings or the weightings may be assigned asymmetrically based on some criteria, such as the user's service usage profile, wherein the service types that are more relevant to the user may be assigned higher weightings.

The partitioning policy (time-slice, location, etc.), number of time slices per period, length of period, and subset weightings can all be tuned to make the Heuristic Algorithm 304 work more effectively for a user based on the user's profile determined from various factors, one of them being the industry vertical such as Security Service, Transportation, Manufacturing Industry, Health Service, etc., in which the user is serving.

5.4.1.3 Computation of Relevant Contact List

Figure 5:
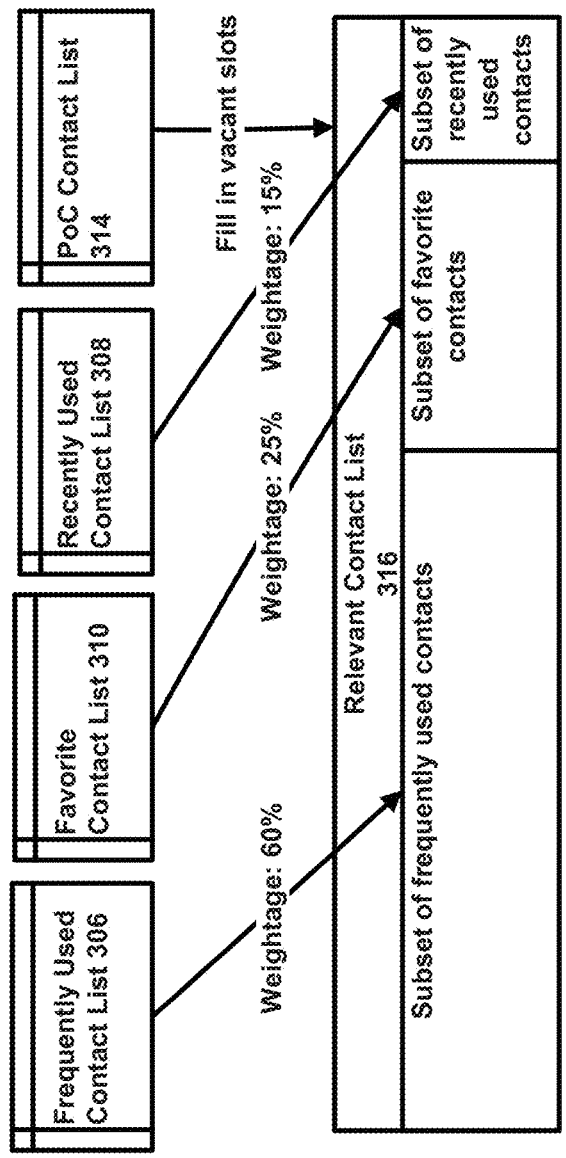
FIG. 5 illustrates the computation of the Relevant Contact List according to one embodiment of the present invention.

FIG. 5 illustrates the computation 314 of the Relevant Contact List 316 according to one embodiment of the present invention. This computation may be performed by the Presence Server 110 (or by some other server).

The data sources used for the formation of the Relevant Contact List 316 can be pre-configured or heuristically determined. The pre-configured data sources may include the Favorite Contact List 310 and the (ordered) PoC Contact List 314. The heuristically determined data sources may include the Frequently Used Contact List 306 and the Recently Used Contact List 308.

Each of these data sources has proportional representation in the Relevant Contact List 316 according to the weightages assigned to it. The weightages assigned to each data source are configurable. The weightages shown in FIG. 5 comprise percentages that are indicative of a typical configuration, but are merely used for the purposes of illustration.

The computation 314 of the Relevant Contact List 316 typically involves some or all of the following steps:

1. The Presence Server 110 determines the number of slots available for each sub-list in the Relevant Contacts List 312 according the weightage assigned to each sub-list.
2. The Presence Server 110 fills in the slots designated for the sub-list with the highest weightage, and carries over any vacant slots to the sub-list with next weightage level.
3. The Presence Server 110 fills in the slots designated for the sub-list with the next highest weightage level, while avoiding duplicate contact entries when filling in the slots. If any slots are left over, the logic returns to step 1 above to fill in the unused slots. If any slots remain vacant, the Presence Server 110 carries over any vacant slots to the sub-list with next weightage level.
4. The Presence Server 110 repeats step 3 until all sub-lists are processed completely.
5. If there are any remaining vacant slots, the Presence Server 110 fills them with contacts from the PoC Contact List 314. This step 5 is configurable and it may be skipped if desired.

One of the notable outcomes of this computation is that, when the number of contacts in the user's PoC Contact List 314 is fewer than the configured size of the Relevant Contact List 316, the user will receive accurate real-time presence information for all the contacts in the PoC Contact List 314.

The typical service usage pattern for most users is that most of the user's activity involves a small number of contacts and there could be several other contacts to whom, the user only makes calls occasionally. This statistical observation can be utilized to implement a further refinement for the computation of the Relevant Contact List 316, wherein the number of contacts taken from data sources other than Recently Used Contact List 308 is pruned so that the hit-ratio for the contacts remaining in the pruned Relevant Contact List 316 is sufficiently high, i.e., the contacts retained in the Recently Used Contact List 308 are involved in a substantial percentage (e.g., 95%) of all the activity performed by the user. The hit-ratio can be configured to the desired level and it can be set to 100% when it desirable to populate all available slots of the Relevant Contact List 316.

Another feature of the computation 314 is that it allows for the Relevant Contact List 316 to be populated from the user's PoC Contact List 314 when there are vacant slots available in the list after all other data sources have been used during the computation of the Relevant Contact List 316. This computation 314 is further refined by allowing the user to prioritize the contacts that should be included in the Relevant Contact List 316 by ordering the PoC Contact List 314.

5.4.1.4 Presence Traffic Discrimination

Another method to reduce presence traffic while still keeping it relevant to the user would be to discriminate between the Network Presence and User Availability messages. Typically, Network Presence messages (when a user logs in or logs out, etc.) tend to be grouped during morning and evening hours, while the User Availability messages (Available, DnD, etc.) occur randomly. Further, most users login and logout daily, but may not change their availability on a daily basis. Also, it may not be desirable to deliver, in real-time, the presence events (unreachable/reachable) caused by network connectivity fluctuations.

Given the above user behavior, it is possible to consider some types of presence information (Available, DnD, etc.) as more relevant than other types of presence information (login/logout, unreachable/reachable, etc.). Presence notifications pertaining to the events considered relevant are delivered to the watchers in real-time, whereas presence notifications for other events which are not considered relevant are withheld and are piggy-backed later along with relevant information.

Figure 6:
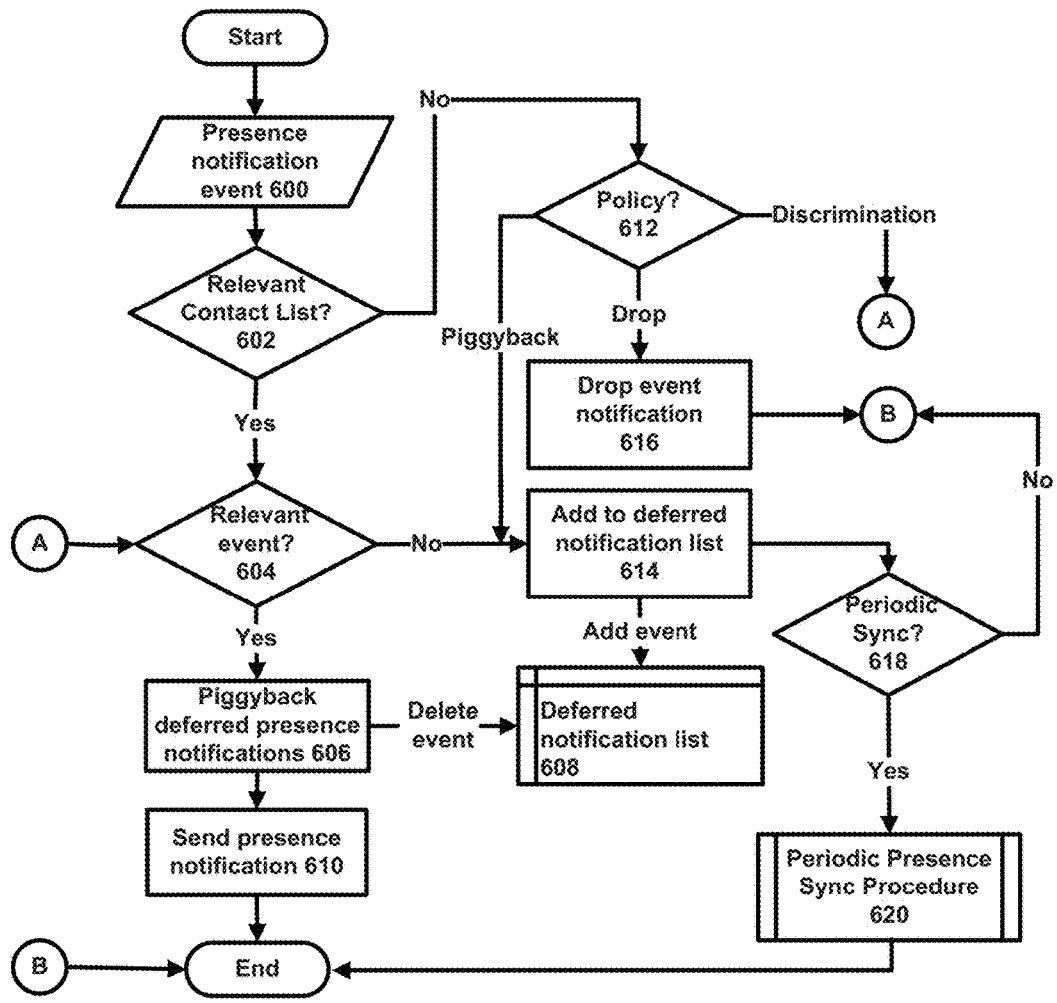
FIG. 6 is a flowchart that illustrates a presence notification delivery mechanism that may be used when a Presence Traffic Discrimination method is applied in conjunction with the Relevant Contact List.

FIG. 6 is a flowchart that illustrates a presence traffic discrimination method for presence traffic reduction that can be applied independently or in conjunction with the method for computing the Relevant Contact List 316.

Block 600 represents a presence notification event occurring.

Block 602 is a decision block that determines whether the event concerns the Relevant Contact List 316. If so, control transfers to Block 604; otherwise, control transfers to Block 612.

Block 604 is a decision block that determines whether the event is a relevant event. If so, control transfers to Block 606; otherwise, control transfers to Block 614.

Block 606 represents deferred event notifications being "piggy-backed" onto the presence notification for the relevant event for the Relevant Contact List 316, and the deferred event notifications being deleted from the deferred presence event notification list 608.

Block 610 represents the presence notifications being sent. Thereafter, the logic ends.

Block 612 is a decision block that determines the policy for handling events for non-relevant contacts, wherein the policy may comprise: (1) a "piggyback" policy wherein control transfers to Block 614 and the event notification is added to the deferred notification list 608, i.e., deferred, until it can be delivered with another presence notification; (2) a "drop" policy wherein control transfers to Block 616 and the event notification is dropped; or (3) a "presence event discrimination" policy wherein control transfers to Block 604. These policies are described in more detail below.

Block 618 is a decision block that determines whether a periodic presence synchronization procedure should be executed. If so, control transfers to Block 620 to perform the periodic presence synchronization procedure, which is described in more detail below; otherwise, the logic ends.

5.4.1.5 Treatment of Contacts not in Relevant Contact List

The Relevant Contact List 312 used for effective presence delivery provides a compromise where accurate real-time presence information is provided only for a relevant subset of contacts. Optimization is achieved by managing the delivery of presence notification messages to other contacts which are not present in the Relevant Contact List 316 at Block 612 by applying one of the policies described above:
1. a "piggyback" policy at Block 614,
2. a "drop" policy at Block 616, or
3. a "presence event discrimination" policy at Block 604.

When the "piggyback" policy is applied to non-relevant contacts, all presence notification messages related to that contact are deferred by the Presence Server 110. The deferred presence information is delivered to the PoC Client 136 by piggybacking the deferred presence notification messages at a later time with a presence notification for a relevant contact. Further, when the "piggyback" policy is in force, the presence delivery time can be time bound by applying the Periodic Presence Synchronization Procedure 620.

When the "drop" policy is applied to non-relevant contacts, all presence notification messages related to that contact are dropped by the Presence Server 110. Only once, at the beginning of a SUBSCRIBE cycle, does the Presence Server 110 indicate the presence status for non-relevant contacts, wherein the presence status is "unknown.

When the "presence event discrimination" policy is applied to non-relevant contacts, only the presence notification messages pertaining to relevant presence events are delivered by the Presence Server 110. All other presence notifications that are not related to the relevant presence events are deferred and these deferred presence notifications are delivered to the PoC Client 136 by piggybacking them along with presence notifications for relevant contacts later. Further, when the "presence event discrimination" policy is in force, the presence delivery time can be time bound by applying the Periodic Presence Synchronization Procedure 620.

5.4.1.6 Periodic Presence Synchronization Procedure

It is possible that no relevant presence event occurs for a prolonged period of time, thereby causing the deferred presence events to stay undelivered for a long time. Therefore, to ensure that the deferred notification list 608 is cleared and the deferred notifications are eventually delivered to the watcher within a reasonable time period, the Periodic Presence Synchronization Procedure 620 may be applied.

The Periodic Presence Synchronization Procedure 620 can be realized using one of the following methods:

1. The watcher's PoC Client 136 periodically polls the Presence Server 110 for any pending deferred presence event notifications, thereby triggering the delivery of the pending deferred presence event notifications, if any.

2. When the Presence Server 110 detects that the deferred notification list 608 for a PoC Client 136 is not empty, it automatically activates the Periodic Presence Synchronization Procedure 620, which will periodically trigger the delivery of the pending deferred presence event notifications, if any. The Periodic Presence Synchronization Procedure 620 stops when the deferred notification list 608 is empty.

5.4.2 Presence Status Synchronization Using Reactive Methods

Due to the heuristic nature of the predictive presence delivery mechanism for effective presence, there could be situations when accurate presence information of a contact is not available to the PoC Client 136 when the user wants it at the time of PoC service invocation towards that contact. The reactive methods described in further detail below provide a mechanism to recover from presence data mismatch in the PoC Client 136.

This includes the following methods:
1. User activity linked presence delivery,
2. On-demand presence, and
3. Automatic presence retrieval on contact list scrolling.
These methods are described in more detail below.

5.4.2.1 User Activity Linked Presence

When a contact does not belong to the Relevant Contact List 316, the PoC Client 136 may wrongly see the presence status of the contact as "available" and the PoC Client 136 may repeatedly fail while trying to invoke a PoC service towards that contact. In order to quickly rectify the mismatched presence information that is causing this problem, the User Activity Linked Presence method should be used, wherein the Presence Server 110 adds the non-relevant contact to the Recently Used Contact List 308 when the user invokes or receives a service request involving that non-relevant contact. Further, upon adding the non-relevant contact to the Recently Used Contact List 308, the Relevant Contact List 316 is updated immediately to include the newly added recently used contact and the Presence Server 110 notifies the watcher in order to update the presence status of that contact to the correct status as maintained by the Presence Server 110.

When a contact entry from the Recently Used Contact List 308 is added to the Relevant Contact List 316 in this manner, it may cause an overflow with respect to the number of slots allocated to the Recently Used Contact List 308 portion of the Relevant Contact List 316. When such overflow occurs, the contact bearing the oldest activity timestamp is removed from the Recently Used Contact List 308 portion of the Relevant Contact List 316. Further, if the non-relevant presence event handling policy is set to the "Drop" policy, the Presence Server 110 notifies the contact's presence status as "Unknown" to the watcher and will send no further presence notifications for that contact.

5.4.2.2 On-Demand Presence Synchronization

Figure 7:
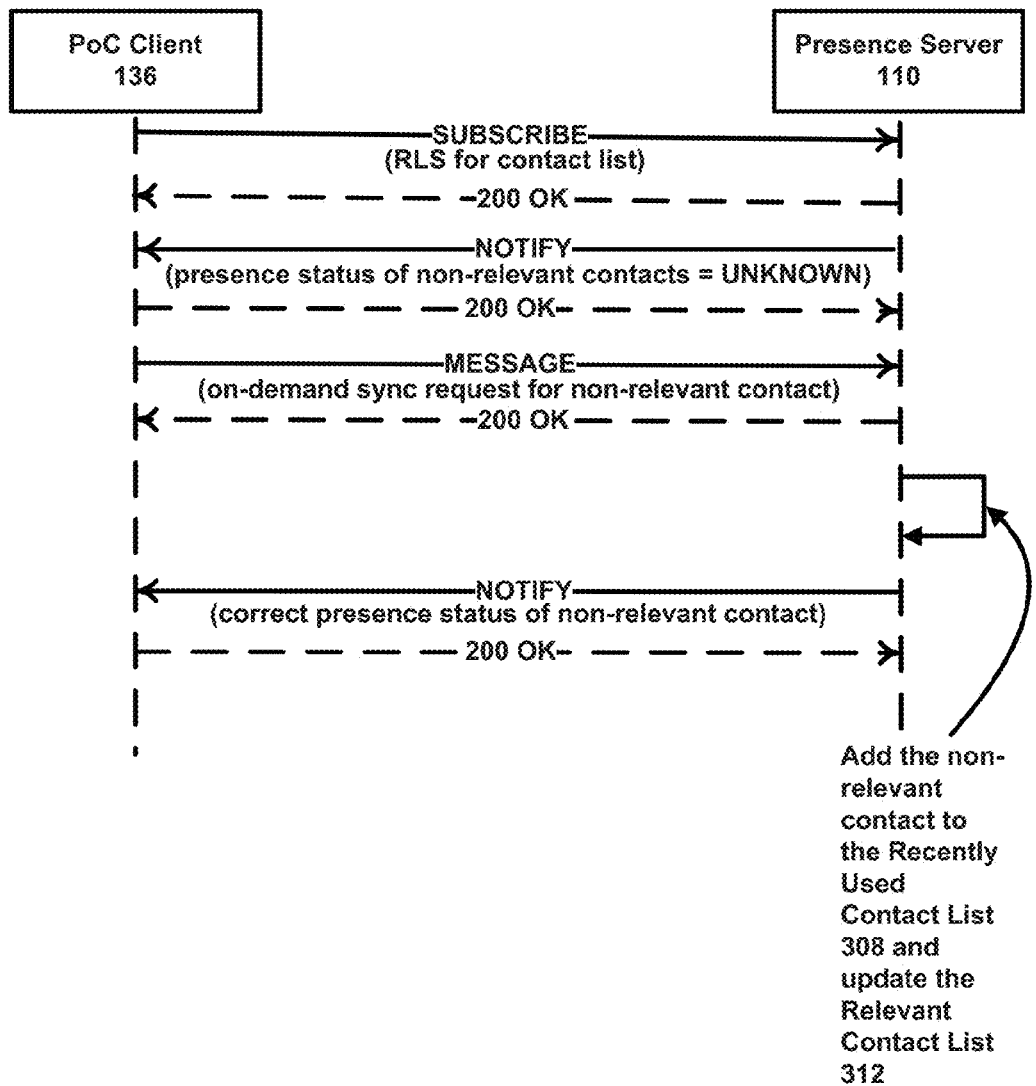
FIG. 7 illustrates the call flow for an on-demand presence synchronization according to one embodiment of the present invention.

When the PoC Client 136 suspects that presence status of one or more contacts may not be in sync with the Presence Server 110, the PoC Client 136 may explicitly request the Presence Server 110 to synchronize the presence status for the specified contact, as shown in FIG. 7.

FIG. 7 illustrates the call flow for an on-demand presence synchronization according to one embodiment of the present invention.

1. The PoC Client 136 first transmits a SUBSCRIBE message to the Presence Server 110, which comprises an SIP message for a resource list subscription for the contact list. The Presence Server 110 acknowledges the message with a 200 OK message.

2. The Presence Server 110 sends a NOTIFY message to the PoC Client 136 indicating presence status for the non-relevant contacts as "unknown. The PoC Client 136 acknowledges the message with a 200 OK message.

3. Thereafter, the PoC Client 136 may transmit on-demand presence synchronization requests for non-relevant contacts to the Presence Server 110. The Presence Server 110 acknowledges the message with a 200 OK message.

4. In response, the Presence Server 110 may send a NOTIFY message to the PoC Client 136 indicating the correct presence status of the non-relevant contacts. The PoC Client 136 acknowledges the message with a 200 OK message.

In this scenario, the PoC Client 136 may request for the synchronization of presence status for any of the contacts for which it already has a prior presence subscription. Further, when processing the on-demand presence synchronization request from the PoC Client 136, the Presence Server 110 adds the contact to the Recently Used Contact List 308 and updates the Relevant Contact List 316 to include the newly added, recently used, contact into the Relevant Contact List 316.

5.4.2.3 Automatic Presence Retrieval on Contact List Scrolling and Searching Large contact lists typically need to be displayed in multiple pages to fit onto small screen on a handset 134. In such cases, it is possible for the PoC Client 136 to retrieve the presence status of the contacts from the Presence Server 110 based on the current page being viewed by the user and/or predictions of the next page to be viewed by the user. Also, the user's behavior in viewing and using the contact list can be leveraged to optimize so as to minimize or avoid any lag in the presence status information.

For example, typical contact list browsing activity by the user may involve the following steps:

1. By default, the first page of contact list is shown when the user opens the contact list.

2. The user may then search or scroll the contact list, and the resulting page of the contact list is displayed.

The on-demand presence synchronization method shown in FIG. 7 can be extended to provide presence status retrieval based on the page of the contact list being displayed. For example, the PoC Client 136 may detect whether the presence status is "unknown" for any of the contacts on the page currently being displayed or on a page that will be displayed. The PoC Client 136 may use the on-demand presence synchronization method to update the presence information for those contacts. Thus, as the user scrolls or searches through the pages of the contact list, the PoC Client 136 anticipates which pages will be displayed and retrieves the presence status for the contacts on those pages.

5.4.3 Other Considerations

5.4.3.1 Decoupling Service Invocation Logic from Presence Status

Normally, the PoC Client 136 does not allow users to initiate calls to contacts who are offline or have set their presence status as DnD. Due to various reasons (e.g., transient network issues), the PoC Client 136 may not always be in synchronization with the presence status of all its contacts in real-time. Because of this, a contact may be shown as offline, unavailable or DnD, but may actually be online and available. This blocks the user from making a call to that contact until the presence status is updated. Similarly, IPA origination to "offline" contacts is not allowed by the PoC Client 136, although the contact may be actually be online and available or DnD. Also, when using effective presence methods, the PoC Client 136 may have incorrect presence status for the non-relevant contacts for which the Presence Server 110 does not delivery presence notifications in real-time.

To avoid blocking the calls or IPA feature due to inaccurate presence status, it is necessary to decouple the presence state from the calls and IPA features. The PoC Client 136 must allow calls and IPA attempts to unavailable (offline and DnD) contacts when effective presence methods are in use.

5.4.3.2 Presence Notification Throttling and Disabling Presence

Some corporations populate each user's contact list with the entire corporation's user list. In this case, a single user's presence update is published to all corporate users. Peak periods may see a large number of users change presence (e.g., shift changes). Large concentrations of corporate users within a single cell site can sometimes deplete the available data bandwidth, interfering with call completion.

In such environments, the presence traffic may still be very high despite the use of effective presence methods. The problems associated with presence updates for corporations with large contact lists are mitigated by throttling presence notifications towards that corporation and, in a worst case scenario, presence notification functionality may be temporarily or periodically disabled for the corporation's users.

For PoC Clients 136 where presence notifications have been turned off, all the users in the contact list will be shown as "available" (online). The PoC Client 136 will publish its presence status as normal. The Presence Server 110 will always have the correct real-time presence status of all the users.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A system for providing communications services in a communications network, comprising:
one or more servers providing communications services over the communications network to a plurality of mobile units in the communications network, wherein the communications services include a Push-to-Talk (PTT) call session, and wherein at least one of the servers is configured to provide a presence delivery method, wherein the presence delivery method comprises:
delivering presence notifications to the plurality of mobile units in the communications network;
partitioning call history data of a mobile unit across different periods of time, wherein the mobile unit is one of the plurality of mobile units;
determining a frequently used contact list of the mobile unit according to the call history data of the mobile unit in each of the different periods of time;
limiting real-time delivery of presence notifications for the mobile unit to a subset of presence notifications pertaining to the mobile unit according to the frequently used contact list of the mobile unit, wherein the subset of presence notifications include fewer presence notifications than all presence notifications pertaining to the mobile unit; and
providing presence notifications for one or more contacts of the mobile unit when the communications services are invoked between the mobile unit and the one or more contacts.

2. The system of claim 1, wherein at least one of the presence notifications indicates a change in network presence of at least one of the plurality of mobile units in the communications network, a change in self-availability status of at least one of the plurality of mobile units in the communications network, or a combination thereof.

3. The system of claim 1, wherein limiting real-time delivery of presence notifications for the mobile unit to the subset of presence notifications comprises:
determining a relevant contact list identifying first contacts of the mobile unit, wherein presence information of the first contacts is more relevant to the mobile unit than presence information of second contacts of the mobile unit; and
limiting real-time delivery of presence notifications for the mobile unit to contacts in the relevant contact list.

4. The system of claim 1, wherein the presence delivery method further comprises:
providing first presence notifications for first contacts to the mobile unit in response to at least one of the servers detecting communications services are invoked between the mobile unit and the first contacts;
providing second presence notifications to the mobile unit in response to a request for second presence notifications from the mobile unit; or
providing third presence notifications to the mobile unit in response to contact list scrolling or searching on the mobile unit.

5. The method of claim 1, further comprising:
determining a separate relevant contact list for each of the different periods of time, wherein the frequently used contact list is determined by combining contacts in each of the separate relevant contact lists.

6. A method comprising:
delivering, by a presence server, presence notifications to a plurality of mobile units in a communications network;
partitioning, by a presence server, call history data of a mobile unit across different periods of time, wherein the mobile unit is one of the plurality of mobile units;
determining, by a presence server, a frequently used contact list of the mobile unit according to the call history data of the mobile unit in each of the different periods of time;
limiting, by the presence server, real-time delivery of presence notifications for the mobile unit to a subset of presence notifications pertaining to the mobile unit according to the frequently used contact list of the mobile unit, wherein the subset of presence notifications include fewer presence notifications than all presence notifications pertaining to the mobile unit; and
providing, by the presence server, presence notifications for one or more contacts of the mobile unit when communications services are invoked between the mobile unit and the one or more contacts.

7. The method of claim 6, wherein limiting real-time delivery of presence notifications for the mobile unit to the subset of presence notifications comprises determining a relevant contact list identifying first contacts of the mobile unit, wherein presence information of the first contacts is more relevant to the mobile unit than presence information of second contacts of the mobile unit, and wherein the subset of presence notifications comprises presence notifications for contacts in the relevant contact list.

8. The method of claim 7, wherein determining the relevant contact list comprises combining a plurality data sources according to weightings assigned to each of the plurality of data sources.

9. The method of claim 7, wherein determining the relevant contact list comprises determining the relevant contact list in accordance with the frequently used contact list, the frequently used contact list comprising third contacts, wherein the third contacts are more frequently contacted, by the mobile unit, than fourth contacts of the mobile unit.

10. The method of claim 9, wherein a separate relevant contact list is determined for each of the different periods of time, and wherein the relevant contact list is determined by combining contacts in each of the separate relevant contact lists.

11. The method of claim 7, wherein determining the relevant contact list comprises determining the relevant contact list in accordance with a recently used contact list, wherein the recently used contact lists identifies fifth contacts, wherein the fifth contacts have been used by the mobile unit to originate or receive a communications service within a time period.

12. The method of claim 7, wherein determining the relevant contact list comprises determining the relevant contact list in accordance with a favorite contact list, wherein the favorite contact list identifies sixth contacts marked as favorites by a user of the mobile unit.

13. The method of claim 6 further comprising using presence traffic discrimination to identify first types of presence notifications more relevant to the mobile unit than second types of presence notifications, and wherein limiting real-time delivery of presence notifications for the mobile unit comprises limiting real-time delivery of presence notifications to the first types of presence notifications.

14. The method of claim 13, wherein the first types of presence notifications include user triggered presence status change notifications, and wherein the second types of presence notifications include network triggered presence status change notifications.

15. The method of claim 6 further comprising using periodic synchronization to send presence notifications to the mobile unit.

16. The method of claim 6 further comprising correcting presence status mismatches by delivering updated presence notifications to the mobile unit.

17. The method of claim 6 further comprising:
tracking activity of the mobile unit; and
providing presence notifications for seventh contacts to the mobile unit when the communications services are invoked for the seventh contacts.

18. The method of claim 6 further comprising receiving a request for presence notifications from the mobile unit.

19. The method of claim 6 further comprising delivering presence notifications to the mobile unit in response to contact list scrolling or searching on the mobile unit.

20. The method of claim 6, wherein the presence server is part of a Push-to-Talk (PTT) platform providing communications services over the communications network to the plurality of mobile units.

21. A presence server comprising:
a processor; and
a non-transitory computer readable storage medium storing programming for execution by the processor, the programming including instructions to:
deliver presence notifications to a plurality of mobile units in a communications network;
partition call history data of a mobile unit across different periods of time, wherein the mobile unit is one of the plurality of mobile units;
determine a frequently used contact list of the mobile unit according to the call history data of the mobile unit in each of the different periods of time;
limit real-time delivery of presence notifications for the mobile unit to a subset of presence notifications pertaining to the mobile unit according to the frequently used contact list of the mobile unit, wherein the subset of presence notifications include fewer presence notifications than all presence notifications pertaining to the mobile unit; and
provide presence notifications for one or more contacts of the mobile unit when communications services are invoked between the mobile unit and the one or more contacts.

22. The presence server of claim 21, wherein the programming includes further instructions to determine a relevant contact list for the mobile unit according to weightings assigned to each of a plurality of data sources, wherein the plurality of data sources comprises the frequently used contact list of the mobile unit, a favorite contact list of the mobile unit, a recently used contact list of the mobile unit, a PTT contact list of the mobile unit, or a combination thereof, and wherein the subset of presence notifications comprises presence notifications for contacts in the relevant contact list.

23. The presence server of claim 21, wherein the programming includes further instructions to:
provide first presence notifications for first contacts to the mobile unit in response to the presence server detecting communications services are invoked between the mobile unit and the first contacts;
provide second presence notifications to the mobile unit in response to a request for second presence notifications from the mobile unit; or
deliver third presence notifications to the mobile unit in response to contact list scrolling or searching on the mobile unit.

24. The presence server of claim 21, wherein the programming includes further instructions to identify first types of presence notifications more relevant to the mobile unit than second types of presence notifications, and wherein the instructions to limit real-time delivery of presence notifications for the mobile unit comprises instructions to limit real-time delivery of presence notifications to the first types of presence notifications.

25. The presence server of claim 21, wherein the programming includes further instructions to:
determine a separate relevant contact list for each of the different periods of time, wherein the frequently used contact list is determined by combining contacts in each of the separate relevant contact lists.

* * * * *